(12) United States Patent
Nagai et al.

(10) Patent No.: US 6,875,528 B1
(45) Date of Patent: Apr. 5, 2005

(54) CERAMIC COMPOSITION, COMPOSITE MATERIAL, COMPOSITE MATERIAL PRODUCTION METHOD, POROUS BODY, OXYGEN SEPARATOR, AND CHEMICAL REACTOR

(75) Inventors: Toru Nagai, Chiba (JP); Noriko Yamada, Chiba (JP); Wataru Ito, Chiba (JP); Hitoshi Dohnomae, Chiba (JP); Tadashi Sakon, Chiba (JP)

(73) Assignee: Nippon Steel Corporation (JP)

( * ) Notice: Subject to any disclaimer, the term of this patent is extended or adjusted under 35 U.S.C. 154(b) by 26 days.

(21) Appl. No.: 09/695,232

(22) Filed: Oct. 25, 2000

(30) Foreign Application Priority Data

| Oct. 25, 1999 | (JP) | 11-302508 |
| Mar. 24, 2000 | (JP) | 2000-084837 |
| Apr. 24, 2000 | (JP) | 2000-123278 |

(51) Int. Cl.$^7$ .............................................. B32B 9/00
(52) U.S. Cl. ...................... 428/701; 428/699; 501/134; 501/135; 501/136; 501/137
(58) Field of Search ................................ 428/689, 699, 428/701; 501/134–137, 39, 41, 152; 252/62.59, 62.63; 95/54; 96/11; 117/944, 947, 948

(56) References Cited

U.S. PATENT DOCUMENTS

| 5,439,706 A | | 8/1995 | Richards et al. |
| 5,820,655 A | * | 10/1998 | Gottzmann et al. ............ 95/54 |
| 5,922,178 A | * | 7/1999 | Isenberg ..................... 204/265 |
| 5,964,922 A | * | 10/1999 | Keskar et al. ................... 95/39 |

FOREIGN PATENT DOCUMENTS

| EP | 0592809 | 4/1994 |
| EP | 0732139 | 9/1996 |
| WO | WO-0048717 | 8/2000 |

OTHER PUBLICATIONS

J.A. Chavez–Carvayar, et al., "Nonstoichiometry and Electrical Properties of the Perovskite $Ca_2Fe_{1.4}Nb_{0.6}O_y$," Key Engineering Materials Vols. 132–136, 1997, pp. 1397–1400.

Peter D. Battle, et al., "Investigation of Magnetic Frustration in $A_2FeMO_6$ (A=Ca, Sr, Ba; M=Nb, Ta, Sb) by Magnetometry and Moessbauer Spectroscopy" J. Material Chemistry, vol. 5, No. 6, pp. 865–870, 1995.

T.J. Gray, "Strontium Ceramics for Chemical Applications" Journal of Power Sources vol. 6, pp. 121–142, 1981.

N.E. Trofimenko, et al., "Structure Oxygen Stoichiometry and Electrical Conductivity in the System Sr–Ce–Fe–O" Solid State Ionics, vol. 99, pp. 201–214, 1997.

Database Inpex "Online" Institute of Electrical Engineers Stevenage, Article No. XP002228919.

Donhang Liu et al., "Structure order–disorder and dielectric response in perovkite–related $SrO–Fe_2O_3–Nb_2O_5$ system: The oxygen–deficient composition $Sr(Fe_{1-x}Nb_x)O_{2.5+y}$ (x= 0.17, 0.25, 0.50)", XP–002189837, J. Appl. Phys., vol. 74, No. 5, Sep. 1, 1993, pps. 3345–3356.

* cited by examiner

*Primary Examiner*—Deborah Jones
*Assistant Examiner*—A B Sperty
(74) *Attorney, Agent, or Firm*—Connolly, Bove, Lodge & Hutz, LLP

(57) ABSTRACT

A ceramic composite with a mixed conducting oxide that has perovskite type crystal structure of $\{Ln_{1-a}A_a\}\{B_xB'_yB''_z\}O_{(3-\delta)}$ where a, x, y, and z are within the range of $0.8 \leq a \leq 1$, $0<x$, $0<y \leq 0.5$, $0 \leq z \leq 0.2$, $0.98 \leq x+y+z \leq 1.02$, and $\delta$ denotes a value that is determined so as to meet a charge neutralization condition. A denotes a combination of one or more kinds of elements selected out of Ba, Sr, and Ca. B denotes a combination of one or more kinds of elements selected out of Co, Fe, Cr, and Ga, the combination always containing Fe or Co. B' denotes a combination of one or more kinds of elements selected out of Nb, Ta, Ti, and Zr, the combination always containing Nb or Ta. The present invention is also directed to a mixed conducting oxide and a ceramic composite. The mixed conducting oxide is of formula $AFe_xO_{(3-\delta)}$. A is selected out of Ba, Sr, and Ca, and is within the range of $0.98 \leq x \leq 1.02$, and $\delta$ denotes a value determined so as to meet the charge neutralization conditions.

37 Claims, 5 Drawing Sheets

CERAMIC COMPOSITION, COMPOSITE MATERIAL, COMPOSITE MATERIAL PRODUCTION METHOD, POROUS BODY, OXYGEN SEPARATOR, AND CHEMICAL REACTOR

BACKGROUND OF THE INVENTION

1. Field of the Invention

The present invention relates to a composite material that consists essentially of a dense continuous film and a porous body of a mixed conducting oxide and an oxygen exchange layer applied to a process of industrial, selective permeation and separation of oxygen or a membrane reactor for partial oxidization of hydrocarbon. The present invention also provides a ceramic composition suitable for composing the composite material.

2. Description of the Related Art

In recent years, there have been remarkably progressed and developed processes of industrially separating and refining a specific component by using an ion conducting material. Among them, in a process of selectively permeating oxygen from a mixture gas such as atmosphere, there are expected applications from a small-scale medical oxygen pump to a large scale atmosphere generating and refining plant. In addition, recently, there has been discussed use of a membrane reactor for partially oxidizing hydrocarbon. In this case, an oxygen mixture gas is isolated from a hydrocarbon gas by a membrane of the ion conducting material, and oxygen selectively permeates a film, and reacts with hydrocarbon.

As oxide ion conductive ceramic materials available for use in such a purpose, there are known an oxide ion conductor for conducting only oxygen ions; and a mixed conducting oxide for conducting electrons or holes as well as oxygen ions. Among them, the mixed conducting oxide can compensate for charges required for maintaining movement of oxygen ions without forming an external current circuit, and thus, is more preferable for use in oxygen separation and a membrane reactor.

That is, in order to oxygen separation by the oxide ion mixed conductor, oxygen potentials at both sides of this mixed conducting oxide can only be differentiated from each other. As a result, only oxygen permeates the mixed conducting oxide from the higher oxygen partial pressure side to the lower oxygen partial pressure side, the other gas components cannot permeate the mixed conducting oxide, and thus, selective oxygen permeation and separation can be carried out. This principle can apply to the membrane reactor. The oxygen potential on the hydrocarbon gas side is low, and thus, an oxygen component selectively permeates the mixed conducting oxide. The resultant oxygen component is consumed by oxidizing reaction of a hydrocarbon gas, and thus, the oxygen potential on the hydrocarbon gas side is maintained to be very low.

A process of oxygen separation employing the foregoing mixed conducting oxide will be described in more detail. Here, a mixture gas (raw material gas) containing oxygen such as air, which separates the mixed conducting oxide is referred to as an "incoming side", and a side at which a desired pure oxygen gas and an oxygen enriched air are obtained is referred to as "outgoing side". In this method, the oxygen partial pressure at the outgoing side is lower than the oxygen partial pressure at the incoming side, but its pressure difference becomes a force of driving oxygen ion diffusion. However, the oxygen gas cannot permeate the mixed conducting oxide while it is in form of oxygen molecule. When the oxygen gas is in an oxide ion state, the oxide ion diffuses in the inside of a crystal lattice of the mixed conducting oxide through an oxygen defect (its movement rate is referred to as an oxide ion diffusion rate). That is, an oxygen molecule at the incoming side is adsorbed onto a surface of the mixed conducting oxide, dissociates into two oxygen atoms, and further, receives a negative charges, thereby producing two oxide ions. When the oxide ions reach the outgoing side after they have moved the inside of the mixed conducting oxide, the negative charges are released on the mixed conducting oxide surface at the outgoing side, and are bonded to an oxygen molecule again. At these steps, an oxygen molecule is exchanged with oxide ions at the incoming side or oxide ions are exchanged with an oxygen molecule at the outgoing side. Thus, this is referred to as an oxygen exchange reaction, and its reaction rate is referred to as oxygen exchange rate.

From the foregoing, the oxygen permeation rate depends on the two factors listed below.

(I) the oxygen ion diffusion rate in the mixed conducting oxide; and (II) the oxygen exchange reaction rate between an oxygen molecule and oxide ions on the mixed conducting oxide surface. Therefore, it is important to improve the above two rates in order to obtain a high oxygen permeation rate. As specific factors for improving the oxygen ion diffusion rate of (I), there have been discussed (a) searching a material having its high oxygen ion conductivity; and (b) filming the mixed conducting oxide. On the other hand, as specific factors for improving the oxygen exchange reaction rate of (II), there has been discussed (c) surface reforming of the mixed conducting oxide. Hereinafter, the prior art in which each of these (a) to (c) has been discussed will be described.

a. Searching a Material having its High Oxygen Ion Conductivity

As an oxygen ion mixed conducting oxide employed for oxygen separation, for example, there is known as an available candidate material, a ceramic composition of the following formula (a) disclosed in Japanese Patent Application Laid-open No. 56-92103 or a ceramic composition of the following formula (b) disclosed in Japanese Patent Application Laid-open No. 61-21717. In addition, in Japanese Patent Application Laid-open No. 6-206707, there has been proposed an ion transport permeable film having its very wide composition range as shown in the following formula (c). These compositions are oxide materials having perovskite type crystal structures.

$\{La_xSr_{(1-x)}\}CoO_{3-\alpha}$ ('x' ranges from 0.1 to 0.9, and "α" ranges from 0 to 0.5)     (a)

$\{La_{(1-x)}Sr_x\}\{Co_{(1-y)}Fe_y\}O_{(3-\delta)}$ ('x' ranges from 0.1 to 1.0, 'y' ranges from 0.05 to 1.0, and δ ranges from 0.5 to 0)     (b)

$A_xA'_{x'}A''_{x''}B_yB'_{y'}B''_{y''}O_{3-z}$ (in the element periodic system adopted according to IUPAC, A and A" are selected from the group consisting of 1, 2, and 3 families and lanthanide family of period 'f'; A' is selected from the group consisting of Sr, Ca, and Mg; and B, B', and B" are selected from transient metals in a period 'd', and further, $0<x<1$, $0<x'<1$, $0<x''<1$, $0<y<1$, $0<y'<1$, $0<y''<1$, $x+x'+x''=1$, $y+y'+y''=1$, and 'z' is a numeric value given when a charge of a composition is neutral.)     (c)

Requirements for these oxides having perovskite type crystal structures to indicate high oxygen permeability include: (1) a large number of oxygen holes; and (2) constantly maintained cubic simple perovskite type structure or the like (Chem. Lett., 1985, pp. 1743–46). Therefore, in order to obtain a material having its higher oxygen permeability, the material preferably includes a plenty of oxygen holes. Alternatively, there is a tendency that such perovskite type structure is unstable when the number of oxygen holes increases. Thus, it is not easy to make these two requirements compatible with each other. The degree of this difficulty is more significant in a material with a large amount of oxygen holes and with a high oxygen permeation rate. When the number of oxygen holes is increased, for example, $SrCoO_{(2-\delta)}$ based $Sr_2Co_2O_5$(or $SrCO_{2.5}$, JCPDS34-1475) with a Brownmillerite type structure or $SrCrO_{2.52}$ with a $BaNiO_3$ type structure (hexagonal crystal) described in JCPD40-1018 or the like is known as a crystal structure that appears instead of a cubic crystal perovskite type, and the oxygen permeability of these materials is lower than that of cubic crystal perovskite.

The number of oxygen holes introduced into a perovskite based material varies depending on the temperature or oxygen partial pressure of use environment as well as a material composition, thus making it difficult to determine it accurately. However, from the material composition, an approximate value can be obtained by the following formula. $(3-\delta)=\Sigma\{(\text{positive ion valence})*(\text{positive ion ratio})\}/2$ where summation requires all cations (positive ions) that constitutes A and B sites of Perovskite. In addition, the number of positive ion valences is 1, 2, and 3 for alkaline metals, alkali earth metals, and rare metals, respectively, and the transient metal elements are calculated by the number of valences listed below.

Valence 2; Ni, Cu, Zn, Pb
Valence 3; Cr, Fe, Co, Al, Ga, In
Valence 4; Ti, Zr, Hf, Mn, Si, Ge, Sn
Valence 5; V, Nb, Ta, Sb, Bi
Valence 6; Mo, W In this method, when an oxygen content $(3-\delta)$ of the conventional material is calculated, $SrCoO_{(3-\delta)}$ and $SrFeO_{(3-\delta)}$ is 2.5, $\{La_xSr_x\}\{Co_{(1-y)}Fe_y\}O_{(3-\delta)}$ ranges 2.95 to 2.55, and $\{La_{(1-x)}Sr_x\}\{Co_{(1-y)}Fe_y\}O_{(3-\delta)}$ ranges from 3 to 2.5. Although a material indicating its high oxygen permeation rate is continuously searched, many of the materials that have been reported range from $2.5 \leq (3-\delta) \leq 3.0$. Although a material with its $(3-\delta)$ being smaller than 2.5 has been searched, a perovskite type with a cubic crystal structure cannot be maintained. Even if the cubic crystal structure is maintained, the oxygen permeation rate is low. Thus, a material of its high oxygen permeation rate cannot be obtained yet (Russian J. Electrochem., 29, 1993, pp. 1201–09, and Solid State Ionics, 96, 1997, pp. 141–51).

Thus, as a mixed conducting oxide material employed for oxygen separation, even of the value of the oxygen content $(3-\delta)$ is low, and a large number of oxygen holes is produced, there has been requested a material with its stable cubic crystal perovskite type structure and its high oxygen permeation rate.

b. Filming the Mixed Conducting Oxide

In an elementary process in which a limited rate is produced when oxygen permeates a mixed conducting oxide, as the thickness of the mixed conducting oxide is reduced, the oxide ion diffusion in the mixed conducting oxide varies from a limited rate (limited diffusion rate), and the oxygen exchange reaction on the surface of the mixed conducting oxide changes to a limited rate (surface reaction limited regimerate). Therefore, even in the case where mixed conducting oxide materials of the same compositions are employed, in the range in which the surface reaction limited regimerate is produced, as the thickness is reduced more significantly, a larger oxygen permeation quantity can be obtained.

Therefore, as a method for actually performing oxygen separation, instead of employing the oxygen ion mixed conducting oxide as a single bulk, it is believed to be effective to form and compose this conductor as a fine and gastight thin film on a porous support body (Teraoka et al., Japanese Ceramics Society Paper Journal, vol. 97, No. 4, pp. 467–72, 1989).

The mechanical strength of this composite material is maintained by a porous body portion; and the porous body functions as a support body. In addition, a thin film portion is responsible for selectively permeating and separating oxygen from a raw material gas. Here, the requirements for the porous support body will be described. In the above paper, the following three conditions for a material that forms a porous body are exemplified.

1) Intimacy with an oxygen ion mixed conducting oxide film is good.

2) In a process of producing a composite material, reaction with the oxygen ion mixed conducting oxide film does not occur, or even if such a reaction occurs, the resultant product does not reduce its oxygen permeability.

3) The thermal expansion coefficient is almost equal to that of the oxide ion mixed conducting oxide film.

The above conditions are indispensable in order to enable the mixed conducting oxide film to be formed on the porous body.

However, it is not easy to find out a material that meets these conditions (1) to (3) simultaneously. With respect to the above condition (3), there is a problem that the linear thermal expansion coefficient of a Co- or Fe-containing perovskite that is a prominent candidate of the mixed conducting oxide film is substantially large as an oxide. For example, the average linear thermal expansion coefficients ranging from room temperatures of the oxides of the following formulas (d) and (e), which is disclosed in Japanese Patent Application Laid-open No. 9-235121, to 800° C. are about 26 ppm/° C. and about 20 ppm/° C., respectively. In contrast, even magnesia that is an oxide known as having its large linear expansion coefficient is 13.4 ppm/° C., which is a far-fetched value (Y. S. Touloukian et al., Thermophysical Properties of Matter vol. 13, IFI/Plenum).

$(La_{0.2}Sr_{0.8})(Co_{0.8}Fe_{0.2})O_{(3-\delta)}$      (d)

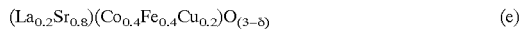$(La_{0.2}Sr_{0.8})(Co_{0.4}Fe_{0.4}Cu_{0.2})O_{(3-\delta)}$      (e)

$(La_{1-x}Sr_x)CoO_{(3-\delta)}$      (f)

$(La_{0.6}Sr_{0.4})CoO_{(3-\delta)}$      (g)

In addition, the perovskite type oxide has its low properties of coexistence with other oxide materials, the above condition (2) greatly limits material selection. For example, when an alumina, zirconia or the like that is a typical oxide material is employed as a support body on which an attempt is made to sinter the oxide or the like of the above formula (f) that is employed as a thin film, there occurs a problem that the alkali earth elements in perovskite are removed, thus decomposing the film or cation is dissolved from, and the oxygen permeation rate is greatly reduced.

In order to avoid such problem, Teraoka et al. proposes that a porous body is produced with the same ceramic composition as the mixed conducting oxide film. In another literature (Teraoka et al., Japanese Ceramics Society Paper Journal, vol 97, No. 5, pp. 533–38, 1989), a composite material in which the porous body and mixed conducting oxide film are oxides of the above formula (g) is fabricated.

In the other laid-opened patent or paper concerning oxygen separation, there are many cases in which any material of a porous body may be employed as long as it meets the above conditions (1) to (3). However, there are a few examples in which a dense film of the mixed conducting oxide is formed on the porous body, and a composite material is produced. As disclosed in Japanese Patent Application Laid-open No. 8-276112, even in the case where a composite material is fabricated, the porous body has the same composition as the dense film of the mixed conducting oxide. Thus, the porous body in the prior art has been eventually forced to have the same composition as the mixed conducting oxide film in order to severe requirements.

On the other hand, in the case where the porous body has the same composition as the mixed conducting oxide film, the porous body has the same sintering properties as the film. In this condition, when an attempt is made to form a gas leakage free mixed conducting oxide film, i.e., a dense film with its high density on the porous body by using a sintering approach, a fine porous body is produced simultaneously during a process of forming the film, and the porosity of the porous body is lowered. When the porosity of the porous body is lowered, there occurs a problem that the permeation rate of the gas in the porous body is lowered, and the performance of oxygen separation of a composite material is lowered.

In order to prevent the porosity of the porous body from being lowered, if the sintering temperature of the film is lowered or if the sintering time is reduced, a well fine mixed conducting oxide film cannot be produced. In this case, there occurs a problem that a supply gas component leaks the film portion during an oxygen separation process, the raw material gas enters the separated oxygen, and the purity of the obtained oxygen is lowered.

In a method in which the porous body has the same composition as the mixed conducting oxide film, it is difficult to produce a composite material with its high oxygen separation rate; and even if such material is successfully produced, its production conditions are very limited. In producing a composite material for oxygen separation caused when a dense film made of the mixture conductive material is combined with the porous body, according to the investigation of the inventor et al., there does not exist any example that discloses the presence of such technical problem earlier than application of the present invention, and therefore, its solution is not known.

The foregoing technical problem is common to a material for selective oxygen permeation and separation process utilizing the mixed conducting oxide membrane and a material for a membrane reactor such as partial oxidization of hydrocarbon. In addition, with respect to the material for the membrane reactor, the atmosphere at the hydrocarbon gas side causes a low oxygen commitment partial pressure. As a result, there occasionally occurs a problem that a mixed conducting oxide material constituting a membrane and/or a porous support body is reduced, thereby producing a volume change, and then, the material cracks and breaks in the worst case. Therefore, the mixed conducting oxide material for a chemical reactor (membrane reactor) that utilizes a membrane process is required to have its excellent breakage resistance (reduction resistance) under a low oxygen partial pressure. Although such problem is well known in the field of a solid oxide fuel cell that utilizes an ion conductor membrane, it is not well discussed in this field that utilizes the mixed conducting oxide. For example, U. Balachandran et al., reports that, although a material of its $La_{0.2}Sr_{0.6}Fe_{0.2}Co_{0.8}O_x$ composition having its perovskite type crystal structure breaks under a methane partial oxidization condition, a material of $SrCo_{0.5}FeO_x$ composition having its non-perovskite type structure has its excellent reduction properties, and can be used as a methane partial oxidization membrane for a long time without breakage (U. Balachandran et al., Applied Catalysis A: General, vol 133 (1995) 19–29). However, according to the investigation of the Inventors, there does not exist any example that measure for improving reduction resistance of the mixed conducting oxide that has its perovskite type crystal structure without changing the crystal structure was disclosed earlier than an application of the present invention.

Now, the requirements for a material of the mixed conducting oxide thin film will be described here. The first requirement is that this material has its high oxide ion conductivity as discussed in factor 'a' because it serves as selective gas separation. In addition to this requirement, it is required that this material can be formed as an gastight thin film. The term "gastight" used here indicates that gas leakage through a film does not occur or even if such leakage occurs, it can be ignored. In order to such fine mixed conducting oxide film, it is required that the density of the film portion is as fine as about 94% or more relevant to theoretical density. However, as exemplified below, note that, even if the film is dense, gas leakage can occur, and the require density cannot be obtained.

For example, of the materials disclosed in the prior art, when a disc-shaped sintered body with 10 mm in diameter and 1 mm in thickness having the composition of the following formula (h) was produced, a dense, gastight sample was obtained. In contrast, in the composition of the following formula (i) disclosed in the prior art, as in the composition although a dense body with its density in excess of 94% was obtained at a sintering temperature of 1200° C., a plenty of fine cracks were observed on the surface of the sintered body. In addition, in measuring the oxygen permeation rate of this sample, considerable gas leakage that can be caused by cracks was detected. Although an attempt was made to prepare a sample by changing the production conditions relevant to the composition of this formula (1), no gastight sample was obtained, thus making it difficult to employ this material as a dense thin film for oxygen separation.

$(La_{0.2}Sr_{0.8})CoO_{3-\alpha}$ \hfill (h)

$SrFeO_{(3-\delta)}$ \hfill (i)

C. Surface Reforming of Mixed Conducting Oxide

As has been described previously, as the thickness of the mixed conducting oxide is reduced, the distance of oxygen ion diffusion is shortened. The oxygen permeation rate is increased in inverse proportion to the thickness of the mixed conducting oxide. This relationship is met in the case where the mixed conducting oxide is sufficiently thick, that is, in the case where oxygen ion diffusion is a limited diffusion rate that limits an oxygen permeation rate. When the mixed conducting oxide is thinly filmed, the oxygen exchange reaction on the mixed conducting oxide surface (surface reaction limited regimerate) limits the oxygen permeation rate. Even if the thickness of the mixed conducting oxide is equal to or smaller than predetermined thickness, it is expected that the oxygen permeation rate does not increase.

In order to overcome the above limited surface rate, there have been reported inventions in which a metal or its oxide typically employed as an electrode material of a solid electrolytic fuel cell or a catalytic material for methane gas partial oxidization is mixed in a mixed conducting oxide or is added to the surface of the conductor, thereby improving the oxygen permeation rate. For example, there have been reported that metal elements of Ag, Pd, and Pt families are impregnated in a mixed conducting oxide that consists of a composition of $Sr_{(1+x)/2}La_{(1-x)/2}Co_{1-x}Me_xO_{3-\delta}$ (Me is at least one element selected from Fe, Mn, Cf, and V) (Japanese Patent Application No. 61-304169); and that a catalyst consisting of a metal such as Ag, Pt, Pd, or $PrO_2$ or its oxide is coated on one surface of the mixed conducting oxide (Japanese Patent Application Laid-open No. 7-240115). However, in as far as the inventor et al., discussed, in the case where a perovskite type oxide discussed in the present invention was employed as a mixed conducting oxide, even if a metal catalyst layer such as Pt, Ag, or Pd or a metal oxide layer such as $PrO_2$ was added to its surface, an increase in oxygen permeation rate was not observed.

SUMMARY OF THE INVENTION

It is an object of the present invention to solve the aforementioned problems in oxygen separation and a membrane reactor using a mixed conducting oxide, and obtain high oxygen permeation rate at an industrially applicable level. That is, it is an object of the present invention to provide a material having its high oxygen ion conductivity required by a factor 'a'; provide a method of solving a problem that it has been difficult to produce a composite material with its high oxygen permeation rate, the problem being unavoidable in the prior art in which a porous body must be formed of the same material as a dense continuous film in filming a mixed conducting oxide in a factor 'b'; and provide an excellent material suitable to surface reforming the mixed conducting oxide in a factor 'c'. In addition, according to the present invention, there can be provided a composite material for oxygen permeation and separation with its high industrial applicability and high oxygen permeation rate by combining these solving means. Further, it is another object of the present invention to provide a material that is particularly preferable to use of a membrane reactor.

The present invention is directed to a ceramic composition as a mixed conducting oxide in perovskite structure. The composition is expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0 to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0<x; 0<y \leq 0.5; 0 \leq z \leq 0.2;$ $0.98 \leq x+y+z \leq 1.02;$ and $\delta$ represents a value which is so determined as to meet charge neutralization conditions.

A composite material according to the present invention includes a ceramic composition as a mixed conducting oxide in perovskite structure. The composition is expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0<x; 0<y \leq 0.5; 0 \leq z \leq 0.2$ $0.98 \leq x+y+z \leq 1.02;$ and $\delta$ represents a value which is so determined as to meet charge neutralization conditions.

An oxygen separator according to the present invention includes a ceramic composition as a mixed conducting oxide in perovskite structure. The composition is expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0<x; 0<y \leq 0.5; 0 \leq z \leq 0.2$ $0.98 \leq x+y+z \leq 1.02;$ and δ represents a value which is so determined as to meet charge neutralization conditions.

A chemical reactor according to the present invention includes a ceramic composition as a mixed conducting oxide in perovskite structure. The composition is expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1;\ 0 < x;\ 0 < y \leq 0.5;\ 0 \leq z \leq 0.2$ $0.98 \leq x+y+z \leq 1.02;$ and δ represents a value which is so determined as to meet charge neutralization conditions.

A composite material according to the present invention comprises a porous body portion comprising a mixed conducting oxide, and a film portion including a gastight dense continuous layer of a mixed conducting oxide formed on said porous body portion, wherein the maximum heat treatment temperature for said porous body portion is higher than that for said dense continuous layer.

In a method of producing a composite material according to the present invention, a porous body portion comprising a mixed conducting oxide is sintered at a temperature higher than the sintering temperature for a dense continuous layer of a mixed conducting oxide to be formed on said porous body portion, and then a film portion including said dense continuous layer is formed on said porous body portion.

A composite material according to the present invention comprises a porous body portion comprising a mixed conducting oxide, and a film portion including a dense continuous layer of a mixed conducting oxide formed on said porous body portion, wherein the densifying temperature for the oxide material of said porous body portion is higher than that for the material of said film portion.

A composite material according to the present invention comprises a porous body portion comprising a mixed conducting oxide, and a film portion including a dense continuous layer of a mixed conducting oxide formed on said porous body portion, wherein the densifying temperature for the porous body portion is higher than that for the material of said film portion, and said porous body portion comprises a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1;\ 0 < x;\ 0 < y \leq 0.5;\ 0 \leq z \leq 0.2$ $0.98 \leq x+y+z \leq 1.02;$ and δ represents a value which is so determined as to meet charge neutralization conditions.

A porous body according to the present invention comprises a mixed conducting oxide expressed by the following general formula (2):

$$AFe_xO_{(3-\delta)} \quad (2)$$

where $0.98 \leq x \leq 1.02$; A represents one or a combination of elements selected from the group of Ba, Sr, and Ca; and δ represents a value which is so determined as to meet charge neutralization conditions.

A composite material according to the present invention comprises a porous body portion comprising a mixed conducting oxide, and a film portion including a gastight dense continuous layer of a mixed conducting oxide formed on said porous body portion, wherein said porous body portion comprises a porous body comprising a mixed conducting oxide expressed by the following general formula (2):

$$AFe_xO_{(3-\delta)} \quad (2)$$

where $0.98 \leq x \leq 1.02$; A represents one or a combination of elements selected from the group of Ba, Sr, and Ca; and δ represents a value which is so determined as to meet charge neutralization conditions.

The present invention is also directed to a method of producing a composite material which comprises a porous body portion including a mixed conducting oxide, and a film portion including a gastight dense continuous layer of a mixed conducting oxide formed on said porous body portion, said porous body portion comprising a porous body comprising a mixed conducting oxide expressed by the following general formula (2):

$$AFe_xO_{(3-\delta)} \quad (2)$$

where $0.98 \leq x \leq 1.02$; A represents one or a combination of elements selected from the group of Ba, Sr, and Ca; and δ represents a value which is so determined as to meet charge neutralization conditions, wherein said porous body portion is subjected to a heat treatment the maximum temperature for which is within the range of 1200° C. to 1400° C., and said dense continuous layer is subjected to a heat treatment the maximum temperature for which is lower than that for said porous body portion by 20° C. or more.

In a composite material according to the present invention, an oxygen exchange layer is formed on a surface of one or either side of an oxide having oxide ion diffusivity, said layer being made of an oxide having its composition different from said oxide having oxide ion diffusivity.

An oxygen separator according to the present invention includes a composite material comprising a porous body portion comprising a mixed conducting oxide, and a film portion including a gastight dense continuous layer of a mixed conducting oxide formed on said porous body portion, wherein the maximum heat treatment temperature for said porous body portion is higher than that for said dense continuous layer.

A chemical reactor according to the present invention includes a composite material comprising a porous body portion comprising a mixed conducting oxide, and a film portion including an gastight dense continuous layer of a mixed conducting oxide formed on said porous body portion, wherein the maximum heat treatment temperature for said porous body portion is higher than that for said dense continuous layer.

According to the present invention, an oxygen exchange-layer consisting of a composition other than that of a composite oxide having the oxide ion diffusion capability is formed on the surface of the composite oxide having the oxide ion diffusion capability, whereby the oxygen permeation rate is substantially improved in comparison with a conventional composite material for oxygen separation, making it possible to separate an oxygen gas from atmosphere with small scale of facilities and inexpensively. This also makes it possible to make contribution to wide industrial use that requires oxygen-enriched air. According to the present invention, even if the oxygen permeable ceramic layer is equal to or less than 300 μm, a high oxygen permeation rate of 50 sccm/cm$^2$ or more can be obtained, and there can be provided performance at a level at which such ceramic layer is practically employed as an oxygen-separated, oxygen-enriched air production apparatus.

According to the present invention, in a selective oxygen permeation and separation process caused by a mixed conducting oxide or in the technical field of a membrane reactor for partial oxidization of hydrocarbon, there can be provided a composite material made of a dense continuous film of an ion mixed conducting oxide and a porous body that provide excellent oxygen permeation characteristics and that is easily produced. In addition, the ceramic composite disclosed in the invention is an excellent material of this porous body or for densely filming. These techniques that the present invention provides greatly contributes to high performance and cost reduction of an apparatus for separating oxygen from air or a membrane reactor.

DETAILED DESCRIPTION OF THE PREFERRED EMBODIMENTS

Figure 1:
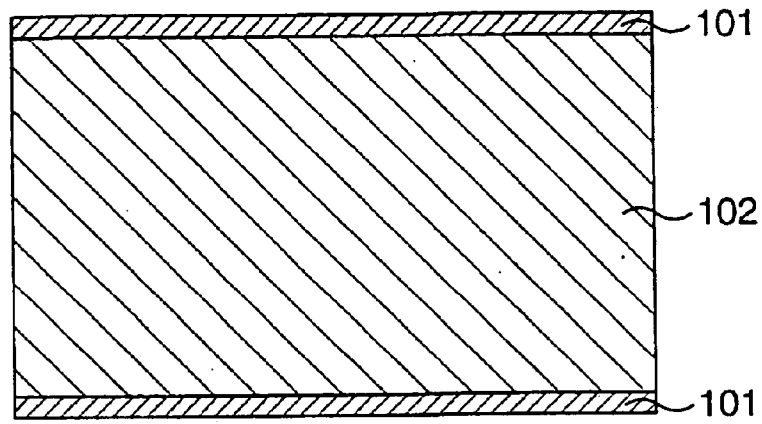
FIG. 1 is a schematic view showing a layer structure of a composite ceramic for oxygen separation when oxygen exchange layers are formed on both sides of an oxide ion diffusion layer according to the present invention.

Hereinafter, specific embodiments to which the present invention is applied will be described in detail.

According to the present invention, there is provided a composite material and a ceramic composite with their high oxygen permeation rate, employed for oxygen separation technique caused by a mixed conducting oxide. The present invention consists of subject matters to solve problems 'a', 'b', and 'c', and a combination of these subject matters. Hereinafter, the subject matters to solve each of these problems will be described in detail.

(a) Material having High Oxide Ion Conductivity

The inventors made utmost effort to search a material of which a cubic crystal perovskite can exist constantly even if a plenty of oxygen holes are introduced. As a result, the inventors found out that, in a perovskite type crystal structure, a small mount of Nb and/or Ta with their 5 average valences are contained as elements positioned at the center of an oxygen octahedron (B site of the perovskite type structure), whereby a cubic crystal perovskite type crystal structure can be significantly stabilized. That is, as additive elements effective to cubic crystallize perovskite with a plenty of oxygen holes, there have been known La for substitute site A of the perovskite type structure; and Fe for substitute site B. The inventors found out that Nb and Ta have a greater advantageous effect of cubic crystallization than these elements. In addition, even if an oxygen hole is introduced until the oxygen content (3–δ) is close to 2.5 or less than 2.5, a cubic crystal perovskite type crystal structure is maintained at least within the temperature range from room temperature to about 1000° C. Then, a composition indicating an oxygen permeation rate equal to or greater than that of a conventionally known mixed conducting oxide is specified, whereby a ceramic composite is completed.

The ceramic composite that the present invention provides is expressed by the following formula (formula 1), and has a perovskite type crystal structure. Site A of the perovskite type structure (site at which 12 anions are coordinated) is expressed by the formula 1, $\{Ln_{1-a}A_a\}$, and Ln denotes a combination of one or more kinds of elements selected from Y or lanthanoide elements; A denotes a combination of one or more kinds of elements selected out of Ba, Sr, and Ca, where $0.8 \leq a \leq 1$. Even if any of Ba, Sr, and Ca is selected or even if two or more elements are selected and combined out of them, there is no possibility that characteristics such as crystal structure stability or oxygen permeability greatly change, and any of these elements can be employed as a ceramic composite of the present invention. Ln introduced into site A produces an affect of stabilizing a perovskite type crystal structure through such introduction. If Ln is introduced in excess of the above range, the oxygen permeability of the ceramic composite is degraded, thus causing the degraded oxygen permeability when employed as a composite material.

   (Formula 1)

In the ceramic composite of the present invention, site B of the perovskite type structure (site at which 6 anions are coordinated; and B and B' expressed by $(B_xB'_yB''_x)$ of formula 1 are required to contain at least one of Co and Fe as element B and to contain at least one of Nb and Ta as element B". That is, in formula 1, 'x' and 'y' are always greater than 0. Even if part of Co and/or Fe is substituted by Cr and/or Ga of 0% to 20% of the total molar number of element B (i.e., 'x' of formula 1), material characteristics do not change drastically. Although Nb and Ta may be employed singly or in combination, its total amount is within the range of $0<y\leq0.5$. If an amount of Nb and Ta is increased, the temperature of refining rises. If an amount of Nb and Ta is increased beyond this range, there occurs a problem that the oxygen permeability of the composite material is lowered. In addition, even if part of Nb and/or Ta is substituted by Ti and/or Zr of 0% to 20% of a total molar number of element B' (i.e., 'y' of formula 1), the material characteristics do not change drastically. Site B may include a combination of one or more kinds of elements B" selected out of Cu, Ni, Zn, Li, and Mg. These elements B' each have less than 3 valences, and thus, these elements are introduced, whereby an oxygen defect is produced at an oxide. As a result, an effect of improving the oxygen permeability is provided. However, if too much elements B' are introduced, the perovskite type crystal structure becomes unstable, and the content is limited to the range of $0\leq z\leq0.2$. The ratio of site A to site B can be changed within the range of $0.98\leq x+y+z\leq1.02$, whereby the material sintering properties can be controlled to certain extent. However, if the ratio of site A to site B is beyond this range, a second phase is produced, which is not preferable.

As in the case of use of a membrane reactor, in the case where it is required to improve particularly the breakage resistance, i.e., reduction resistance of the ceramic composite under a low oxygen partial pressure, the content of Co of element B, the Co being en element easily reduced, is reduced to 10% or less of the molar number of Fe so as not to contain Cu and Ni of element B", the Cu being an element easily reduced. Cr and Ga of elements B and Nb, Ta, Ti, and Zr of elements B', and Zn, Li, and Mg of elements B' are elements that is reduced more easily than Fe that is one of the elements B, and thus, the content is limited in the same way as above.

There is no example in which the ceramic composite of its composition range has been discussed or reported for the purpose of oxygen separation, membrane reactor and the like. There can be provided a novel material whose effectiveness is found out by the present invention.

(b) Filming Mixed Conducting Oxide

The inventors discussed a problem that a porous body is formed of the same material as a dense film, making it difficult to produce a composite material with its high oxygen permeation rate. Then, the inventor noted a temperature required for densifying individual materials constituting a composite material and a temperature range capable of heat treatment without decomposition of such materials. Then, the inventors found out that the following two methods are effective means for solving the foregoing problem. That is, with method (1), the densifying temperature of an oxide material constituting a porous body is set to be sufficiently higher than that of a material of the film portion. With method (2), the maximum heat treatment temperature caused during production of the porous body is set to be higher than that of during film forming. By employing either or both of these two methods, there can be easily produced a composite material in which the porosity of the porous body is hardly lowered even in a process of forming the film portion, the composite material having its oxygen permeation rate.

In producing such composite material, a ceramic composite that meets the following conditions for a material of a porous body is effective.

1) The material is stable without being decomposed at a high densifying temperature and/or at a temperature sufficiently higher than a temperature of forming the film portion.

2) The material has good intimacy with a mixed conducting oxide film.

3) The material does not react with the mixed conducting oxide film or even if it reacts, the product does not reduce oxygen permeability.

4) The material has the same thermal expansion coefficient as the mixed conducting oxide film.

5) The material has high oxygen permeation rate.

Among these conditions for the ceramic composite, the inventor paid attention to condition (4). As, described above, the linear thermal expansion coefficients of candidate materials of the mixed conducting oxide film range from 20 to 25 ppm/° C. that is substantially great for an oxide material. As a result of discussion, the inventor found out that a perovskite type oxide containing Co or Fe at site B is suitable as an oxide material having its thermal expansion coefficient as high as the above as with the candidate material of the mixed conducting oxide film.

However, even in the perovskite type oxide containing Co or Fe at site B, the inventor found out that the crystal structure may change from a cubic crystal to a $BaNiO_3$ type hexagonal crystal depending on temperature or oxygen atmosphere, and if this structural change occurs, the thermal expansion coefficient is substantially lowered, which makes it unsuitable as a porous material. Further, the inventor found that, when the material is made porous, the crystal structure can be easily changed to $BaNiO_3$ type. Based on these findings, the inventor made utmost effort to search a stable material that is a perovskite type oxide containing Co or Fe at site B, that is high at a densifying temperature, that is excellently stable at a high temperature, and that is stable in perovskite type structure even within a wide temperature range and a wide oxygen partial pressure.

As a result, the inventor found out the fact that:

(1) Nb and/or Ta as well as Co or Fe are/is contained in site B of perovskite, whereby there can be provided a porous body of which the perovskite type structure can be stabilized more significantly, the sintering temperature is significantly increased, and, and the porosity is hardly lowered even during heat treatment;

(2) even if part of Co and/or Fe are/is substituted by Cr and/or Ga, and part of Nb and/or Ta are/is substituted by Ti and/or Zr, as far as its total substitution quantity is equal to or less than the limit, the foregoing material characteristics such as crystal structure, thermal expansion coefficient, or higher sintering temperature do not change drastically;

(3) even if part of Co, Fe, Nb, and Ta is substituted by Cu. Ni, Zn, Li, or Mg, as far as its total substitution quantity is less than the limit, the foregoing material characteristics such as crystal structure, thermal expansion coefficient, and higher sintering temperature do not change drastically as in the above case or the oxygen permeability is improved; and (4) a composition range that does not contain Cu and Ni, the Co content of which is equal to or less than a certain limit, is excellent in reduction resistance.

In addition when a dense film of an oxygen permeable mixed conducting oxide was formed on this porous body, it was verified that there can be provided a very excellent porous body in which thermal expansion coefficients well match each other, good film intimacy is produced, and any reaction occurs such that the film ion conductivity is lowered.

Further, in a ceramic composite developed for this porous body that is a mixed conducting oxide, whereby a dense bulk is produced to evaluate an oxygen permeation rate, it was verified that this ceramic composite has its oxygen permeation rate equal to or higher than a typical material of the mixed conducting oxide film for oxygen separation, for example, the oxide of the formula (f). This result indicates that the ceramic composite of the present invention is effective as a dense film material as well as porous body material. The inventor discussed a material of a dense film wherein a composite material with its high oxygen separation performance is obtained in combination with the porous body produced by the above ceramic composite, and achieved the present invention.

Furthermore, the inventors found out the following facts. That is, in the case where a perovskite type mixed conducting oxide containing Co is subjected to a temperature higher than that required for fining, the material is easily decomposed. In contrast, a perovskite type mixed conducting oxide composed of only Fe such as $SrFe_xO_{(3-\delta)}$ at site B is stable without being decomposed even at a high temperature of about 1350° C. that is much higher than a densifying temperature of about 1200° C. Even in producing a porous body at a high temperature of about 1350° C. with this $SrFe_xO_{(6=\delta)}$, it was verified that a porous body having its sufficient porosity as a support body can be produced.

As has been described previously, if a dense body is produced with $SrFe_xO_{(3-\delta)}$, cracks easily occur, making it difficult to provide a material that can be fully used as a separation film in view of air-tightness or mechanical strength. In contrast, it was found that the inventive porous support body has a sufficient mechanical strength. Further, it was verified that the excellent characteristics of these porous support body were also similar in the material shown in the following formula (formula 2), wherein Sr of $SrFe_xO_{(3-\delta)}$ is substituted by another alkali earth element:

$SrFe_xO_{(3-\delta)}$ (formula 2)

where $0.98 \leq x \leq 1.02$, A denotes a combination of one or more kinds of elements selected out of Ba, Sr, and Ca, and δ denotes a value determined so as to meet the charge neutralization conditions.

On the other hand, in the case where a dense film was formed of the same material as the above on the porous support body of this $AFe_xO_{(3-\delta)}$, thereby producing a composite material, as is predicted from the result of producing the bulk sintered body of $SrFe_xO_{(3-\delta)}$, a gas leakage free film with its gastightness could not be formed. In contrast, in the case where a dense film was formed of a mixed conducting oxide material capable of producing an gastight bulk sintered element such as $(La_{0.2}Sr_{0.8})CoO_{3-\delta}$ on a $AFe_xO_{(3-\delta)}$ porous support body, a gas leakage free, excellent composite material for oxygen separation was obtained.

The inventor discussed a material of a dense film in which a composite material with its high oxygen separation performance is obtained in combination with these porous bodies, and achieved the present invention.

In the composite material that the present invention provides, a porous body portion is composed of a mixed conducting oxide, and the porosity preferably ranges from 20% to 80%, and more preferable ranges from 40% to 60%. This range of the porosity of the porous body is determined based on a condition in which the porous body portion does not resist against gas permeation during an oxygen separation process and a condition in which the mechanical strength of the composite material is soundly maintained. The porosity of the porous body is calculated by {100−relative bulk density (%)} where this relative bulk density is obtained by dividing the bulk density of the porous body by theoretical density. In the case where the bulk density of the porous body is simply obtained by measuring the external size of the support body to obtain a volume, and then, dividing a weight in the case of a porous body of its simple shape such as a disc, cylinder or plate.

The porosity of the porous body can be changed according to the composition of the porous body material, the quantity and type of resin to be mixed, molding conditions, and further, sintering temperature or the like. The mixed resin quantity is increased, the molding pressure is reduced, or the sintering temperature of the porous body is reduced, thereby making it possible to improve the porosity of the porous body.

Although the thickness of the dense continuous film of the mixed conducting oxide of the film portion formed on this porous body may be such that the oxygen separation rate, gas selectivity and the like is not lowered, a range from 10 μm to 1 micron is preferable. If the dense film is thicker beyond the upper limit, the quantity of oxygen that can be separated by this composite material may be reduced. Alternatively, if the dense film is thinner beyond the lower limit, there occurs a problem that it becomes difficult to form a dense film free from gas leakage, the strength of the film is lowered to easily break, and the selectivity of gas is lowered while the composite material is used for oxygen separation.

In order to determine a combination of a porous body and a material of a dense continuous film, it is important to note a relationship between material densifying temperatures that is one of the features of the present invention. Specifically, the densifying temperature of the materials comprising porous body is required to be equal to or higher than that of the materials comprising the dense film by at least 20° C. or preferably 50° C. The material densifying temperature used here indicates a sintering temperature required for the relative density of the material to be 94% or higher for example.

However, the relative density that is used for the definition of densifying temperature must not always be 94%, and can be determined within the range from 90% to 100%. This relative density is important in determine a combination of materials for the porous body and the dense continuous film. To do this the a sintering temperature equal to or greater than this determined value is obtained, and is compared with another, thereby determining a combination of the materials for the porous body and the dense continuous film.

In addition to this dense film, the film portion may contain a porous catalyst layer made of a metal or its oxide formed on an interface between the film and the porous body. This porous catalyst layer is effective in increasing an oxygen/oxide ion exchange reaction rate between a gas phase and a solid phase on the surface of the dense film or in its vicinity or oxidization reaction rate of hydrocarbon and the like, or alternatively, in expressing reaction selectivity by restricting advancement of a specific reaction. The type and quantity or setting location of the catalyst layer may be selected as required. For example, the catalyst layer may be disposed at the inside or on the surface of any porous layer provided onto the film and at the inside or on the surface of the porous body that serves as a support body.

It is one of the features of the present invention to set the maximum heat treatment temperature during production of the porous body to be higher than that produced when a dense film is formed. Specifically, the maximum heat treatment temperature during production of the porous body is required to be equal to or higher than that of production of the dense film by 20° C. or preferably 50° C. In this case as well, in order well to improve the density of the dense film and ensure gastightness, the maximum heat treatment temperature during film forming is required to be about a sintering temperature required for the densifying temperature of the film material, i.e., the relative density of the material to be 94% or more.

In a composite material that the present invention provides, a preferable material for a porous body is a ceramic composite of the above formula (formula 1). Nb or Ta as well as Co or Fe is contained in site B of perovskite, whereby there can be provided a porous body in which the perovskite type structure can be stabilized, the sintering temperature can be significantly increased, and the porosity is hardly lowered even during heat treatment.

On the other hand, one of the preferable mixture conductive materials that are formed as a dense continuous film onto the porous body produced by the ceramic composite of the above formula (formula 1) has a composition expressed by the general formula below (formula 3).

$$\{Ln_{1-a}A_a\}\{B_xB'_y\}O_{(3-\delta)} \quad \text{(Formula 3)}$$

Where site A is expressed by $\{Ln_{1-a}A_a\}$, and Ln denotes a combination of one or more kinds of elements selected from Y or one or more kinds of lanthanoide elements; A denotes a combination of one or more kinds of elements selected out of Ba, Sr, and Ca, and ranges from $0.8 \leq a \leq 1$. Even if any of these Ba, Sr, and Ca is selected or even if two or more kinds of elements are selected and combined out of these elements, the characteristics such as stability of crystal structure or oxygen permeability do not change drastically, any of which can be employed as a dense continuous film of the present invention. Ln introduced into site A produces an effect of stabilizing a perovskite type crystal structure through such introduction, but if the Ln is introduced beyond the range, the oxygen permeability is lowered.

Site B is expressed by $(B_xB'_y)$, and contains at least one of Co and Fe as element B. B' denotes a combination of one or more kinds of elements selected out of Cu, Ni, Zn, Li, and Mg, and ranges from $0 \leq y \leq 0.2$. Because Site B does not include Nb and Ta, there is provided an advantage that a lower densifying temperature than that of the porous body, and at least one of Co and Fa is included, thus providing the same linear thermal expansion coefficient as the porous body. Further, site B includes elements having their smaller valence number, whereby there is provided an advantage that an oxygen defect occurs, resulting in high oxygen permeability. However, if too many elements are introduced, the perovskite type crystal structure becomes unstable. Thus, the quantity of introduction of element B' is limited to within the range of 0.2 or less. That is, in formula 2, the range is $0 \leq y \leq 0.2$.

The value of x+y that specifies a ratio of site A to site B is $0.98 \leq x+y \leq 1.02$. If the value is beyond this range, a second phase is produced or the oxygen permeation rate is lowered, which is not preferable.

A further preferable mixture conductivity material as a dense continuous film is a ceramic composite expressed by formula 1. This is because there is a great advantage that, while oxygen permeability is improved without lowering it, a more stabilized crystal structure can be provided. However, it is required that such composition is selected so that the densifying temperature of the film material is lower than that of the porous body. The densifying temperature of the dense continuous film can be lower than that of the porous body by setting the content of Nb and Ta in the film lower than that of Nb and Ta of the porous body. In addition, although the densifying temperature can be controlled to certain extend by increasing or decreasing the content of another element such as Cu, Li or Ba, it is simpler to control the content of Nb and Ta.

Of materials preferable to produce this dense continuous film, the oxygen permeation rate can be increased in particular in the ranges of formulas 4, 5, and 6:

$$\{Ln_{1-a}A_a\}Co_yO_{(3-\alpha)} \quad \text{Formula 4}$$

where Ln denotes a combination of one or more kinds selected from Y or lanthanoide elements; A denotes a combination of one or more kinds of elements selected from Ba, Sr, and Ca wherein $0.8 \leq a \leq 1$, $0 \leq x$, $0.98 \leq y \leq 1.02$, and $\delta$ denotes a value determined so as to meet the charge neutralization conditions:

$$A_a\{Co_{1-x}Fe_x\}O_{(3-\delta)} \quad \text{(Formula 5)}$$

where A denotes a combination of one or more kinds of elements selected out of Ba, Sr, and Ca; wherein $0.98 \leq a \leq 1.02$, $0 \leq x \leq 0.2$, and $\delta$ denotes a value determined so as to meet the charge neutralization conditions:

$$A_a\{Co_xFe_yB'_x\}O_{(3-\delta)} \quad \text{(Formula 6)}$$

where A denotes a combination of one or more kinds of elements selected out of Ba, Sr, and Ca; B' denotes a combination of one or more kinds of elements selected out of Cu, Ni, and Zn, and where $0.98 \leq a \leq 1.02$, $0 \leq x$, $0 \leq y$, $0 \leq z' \leq 0.2$, $0.98 \ x+y+z \leq 1.02$, and $\delta$ denotes a value determined so as to meet the charge neutralization conditions.

Apart from the above material, a material of mixture conductivity preferable as a dense continuous film is a ceramic composite expressed by the foregoing formula (formula 1), wherein a total amount of contained Nb and Ta is smaller than that of the porous body. A total amount of Nb and Ta of the dense continuous film is smaller than that of the porous body, whereby the film densifying temperature can be reduced lowly. Further, this material provides a great advantage that the perovskite type structure can be maintained more constantly while improving the oxygen permeability in comparison with a material expressed by the foregoing formula (formula 2).

Of materials preferable to this dense continuous film, the oxygen permeation rate can be increased in the range of formulas 7 and 8 shown below:

$$A\{Co_xFe_yB_z\}O_{(3-\delta)} \quad \text{(Formula 7)}$$

where A denotes a combination of one or more kinds of elements selected out of Ba, Sr, and Ca; and B denotes a combination of one kind or two kinds of elements selected out of Nb and Ta, wherein $0 \leq x$, $0 \leq y$, $0 \leq z \leq 0.2$, $0.98 \leq x+y+z+z' \leq 1.02$, and $\delta$ denotes a value determined so as to meet the charge neutralization conditions:

(Formula 8)

where A denotes a combination of one or more kinds of elements selected out of Ba, Sr, and Ca; B denotes a combination of one kind or two kinds of elements selected from Nb and Ta; and B' denotes a combination of one or more kinds of elements selected out of Cu, Ni, and Zn, wherein $0 \leq x$, $0 \leq y$, $0 \leq z \leq 0.2$, $0 \leq z' \leq 0.2$, $0.98 \leq x+y+z+z' \leq 1.02$, and $\delta$ denotes a value determined so as to meet the charge neutralization conditions.

In the present invention, in order to reinforce the strength of this composite material, a reinforce element may be provided together with the porous body portion and the film portion.

In producing the porous body according to the present invention, there can be used a method employed for producing a ceramics porous body. As one of the methods, there is a method in which an oxide containing required elements is employed as a raw material, and is sintered. In addition, as the raw materials, there are employed a method employing oxides, chlorides, inorganic acids or salts such as carbonate, nitrate, sulfate, citrate, organic whewellite salt, halides such as chlorides, bromides or iodides, or hydroxides, oxy-halides in which these are mixed at a predetermined rate, and are sintered.

In addition, there may be employed a method of dissolving any of the water soluble salts into water at a predetermined rate, and then, evaporating and drying it; or a method of drying a material with a freeze dry technique or spray dry technique, and then, sintering it; a co-deposition method of dissolving a water soluble salt in water, adding an alkaline solution such as ammonia water, and sintering it as a deposition of an hydroxide; or a Sol-Gel method of employing a metal alcoxide as a raw material, hydrolyzing it to obtain a gel, and sintering the gel.

The sintering of the porous body is generally divided into two steps; temporary sintering and primary sintering (sintering). The temperature range of the temporary sintering is 400 to 1000° C. for from several hours to ten and several hours. It is possible to mold and primary sintering temporarily sintered powders only, or to mold and primary sintering by mixing resin such as poly vinyl alcohol (PVA) or the like with the temporarily sintered powders. Although the temperature of the primary sintering depends on the composite or the like, it ranges generally from 700 to 1400° C., preferably from 1000 to 1350° C.

In addition, in the primary sintering, a temperature higher than that when the film portion is sintered on this porous body later is selected. The primary sintering time depends on the composition and sintering time, and generally requires several hours or more. Although the primary sintering is generally carried out in atmosphere, the sintering under controlled atmosphere may be carried out. In addition, as means for molding the porous body, as in production of a general bulk ceramics, temporarily sintered powders or mixed powders are filled in dice, and the filled powders may be pressurized or molded. Alternatively, a mud casting technique or protrusion molding technique and the like may be employed.

On the other hand, a dense continuous film can be produced by a method generally employed for producing a ceramic film. Such film may be produced by a so-called thin film forming method including PVD or CVD such as vacuum vapor deposition technique. More economically, a method of coating slurry-like raw material powders or temporarily sintered powders and sintering is preferable. The sintering temperature of the dense film must be refined so as to ensure that gas leakage does not occur with the film, and a condition in which the porosity of the porous support body is not lowered significantly in this sintering process must be selected. As far as a combination of materials of the dense film and porous support body is determined in accordance with requirements of the present invention, it is sufficient if the sintering temperature of the dense film is set to about the densifying temperature of a material that constitutes a film. The sintering time generally requires several hours.

(c) Surface Reforming of Mixed Conducting Oxide

There has been proposed a model that the oxygen permeation rate depends on two factors, i.e., (I) the oxide ion diffusion rate in a mixed conducting oxide; and (II) the oxygen exchange rate between an oxygen molecule and an oxide ion on the mixed conducting oxide surface. However, there has not been clarified a quantitative relationship between each of these factors and the oxygen permeation rate. The inventors produced a testing instrument employing oxygen isotopes-, making it possible to separately evaluate the oxide ion diffusion rate and the oxygen exchange rate that could not be separated in measuring the oxygen permeation rate. Further, the inventors developed a model that generalizes the oxygen permeation rate from these physical properties. The inventors investigated the oxide ion diffusion velocities and oxygen exchange velocities of various metals and oxide materials of various compositions by employing the testing instrument. As a result, in the case where the mixed conducting oxide was thinly filmed, it was verified that the oxygen exchange rate limits the oxygen permeation rate. That is, it was verified that improvement of the surface response, i.e., improvement of the oxygen exchange rate is important in practical materials. In addition, it was verified that the oxide ion diffusion rate and oxygen exchange rate of the perovskite type oxide is totally very high, and however, a material with its high oxide ion diffusion rate does not always produce a high oxygen exchange speed.

In the present invention, there is formed an "oxygen exchange layer" that has a function for enhanced oxygen exchange reaction. Inside of the mixed conducting oxide has a function for oxide ion diffusion of (I) and the "oxygen exchange layer" has a function for oxygen exchange reaction of (II) for the purpose of sharing the functions, wherein independent materials suitable to these respective functions are multiply layered, thereby substantially improving the oxygen permeation rate. Although an oxide layer responsible for oxide ion diffusion has been expressed as a "dense continuous layer" in the section 'a' and 'b', it is expressed as an "oxide ion diffusion layer" from the viewpoint of functional comparison in the following description of the section 'c'. Therefore, the "dense continuous layer" in the sections 'a' and 'b' is basically equivalent to the "oxide ion diffusion layer" in the section 'c'.

Figure 2:
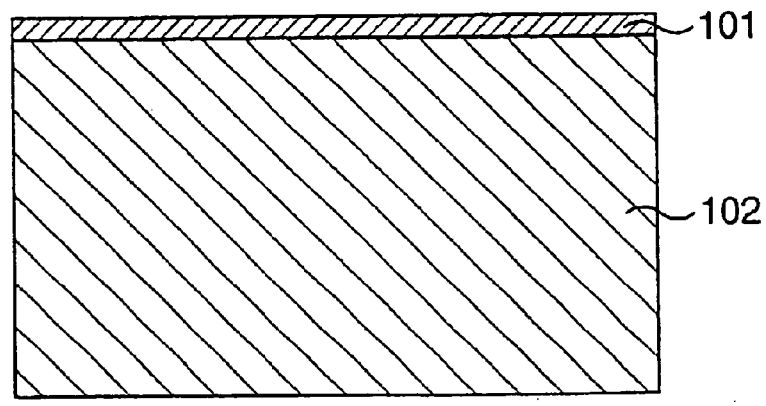
FIG. 2 is a schematic view showing a layer structure of a composite ceramic for oxygen separation when a dense oxygen exchange layer is formed on one side of the oxide ion diffusion layer according to the present invention.

According to the preferred embodiment of the present invention, as shown in FIG. 1, for example, there is exemplified a composite material of its three-layer structure in which oxygen exchange layers (101) are formed on both sides of an oxide ion diffusion layer (102). A composite material of its two-layer structure as shown in FIG. 2 in which the oxygen exchange layer (101) is formed on one side of the oxide ion diffusion layer (102) can produce its high oxygen permeation rate in comparison with a case in which no oxygen exchange layer is formed. However, the composite structure of its three-layer structure as shown in FIG. 1, which can improve the oxygen exchange rate on both of the incoming and outgoing sides is more preferable in view of improvement of the oxygen permeation rate. In addition, in the case of the composite material of its three-layer structure, the oxygen exchange layers are produced differently in composition or form according to the different gas phase oxygen partial pressures on the incoming and outgoing sides, whereby higher oxygen permeation rate can be obtained.

Figure 3:
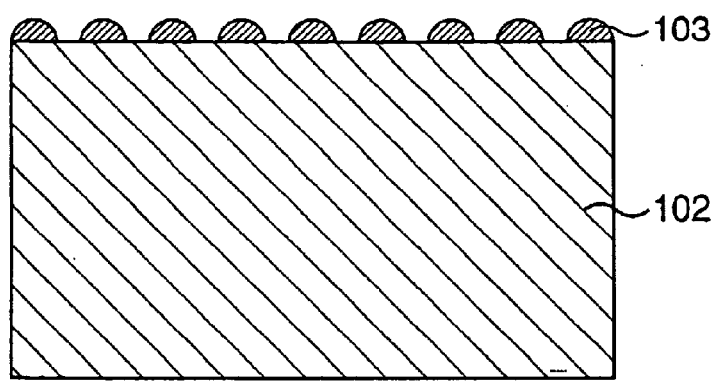
FIG. 3 is a schematic view showing a layer structure of a composite ceramic for oxygen separation when an island-shaped oxygen exchange layer is formed on one side of the oxide ion diffusion layer according to the present invention.
Figure 4:
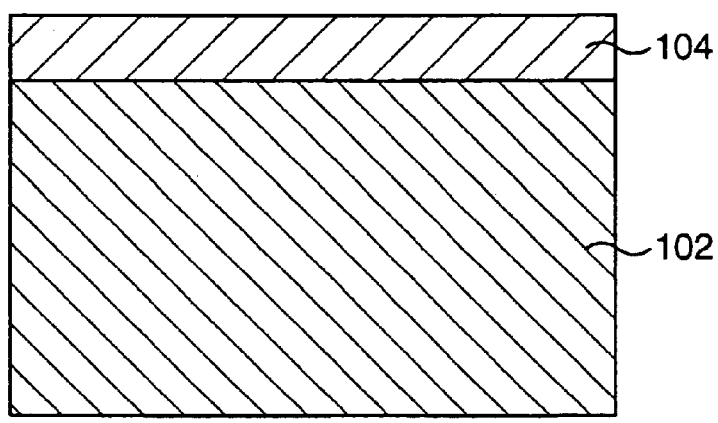
FIG. 4 is a schematic view showing a layer structure of a composite ceramic when a porous oxygen exchange layer is formed on one side of the oxide ion diffusion layer according to the present invention.

Now, the forms of the oxygen exchange layer will be described here. In the form of a dense film, the film thickness of the oxygen exchange layer is desired to be 30 $\mu$m or less, is preferably 10 $\mu$m or less, and more preferably 5 $\mu$m or less in order to interfere oxide ion diffusion with the oxygen exchange layer. In addition, the oxygen exchange layer is formed in an island shape as shown in FIG. 3 or is made porous as shown in FIG. 4, whereby a surface area in which oxygen exchange reaction occurs is increased, and the oxygen exchange reaction rate is substantially increased. As a result of the detailed discussion of the inventors the oxygen exchange layer is formed in such island shape or is made porous, whereby the oxygen exchange rate can be increased by about 10 times as high as a case of an oxygen exchange layer made of a dense film, although the rate before reformed has been equal to that of the above case.

In addition, the inside of the oxygen exchange layer is formed as a multi-layered structure or composite structure that consists of oxides with their different compositions, there can be provided an effect of improving abrasion resistance or heat resistance. Alternatively, if the oxygen exchange layer is formed as a multi-layered structure or composite structure that consists of oxides other than a perovskite type oxide and another ceramics such as metal or nitrides, there can be provided an effect of improving abrasion resistance or heat resistance similarly.

In the case where the thickness of the oxide ion diffusion layer is thinly filmed to 300 $\mu$m, an effect of improvement in oxygen permeation rate caused by the oxygen exchange layer is particularly substantial. In general, in the case where the thickness of the mixed conducting oxide layer is 300 $\mu$m or more, the oxide ion diffusion of the aforementioned oxygen permeation mechanisms is more dominant (limited diffusion rate). Alternatively, when the thickness is 300 $\mu$m or less, the oxygen exchange reaction is more dominant (limited surface rate). Therefore, the effect of such improvement is greater as the thickness of the oxide ion diffusion layer is thinner. This fact is significant in practical point of view.

Figure 5:
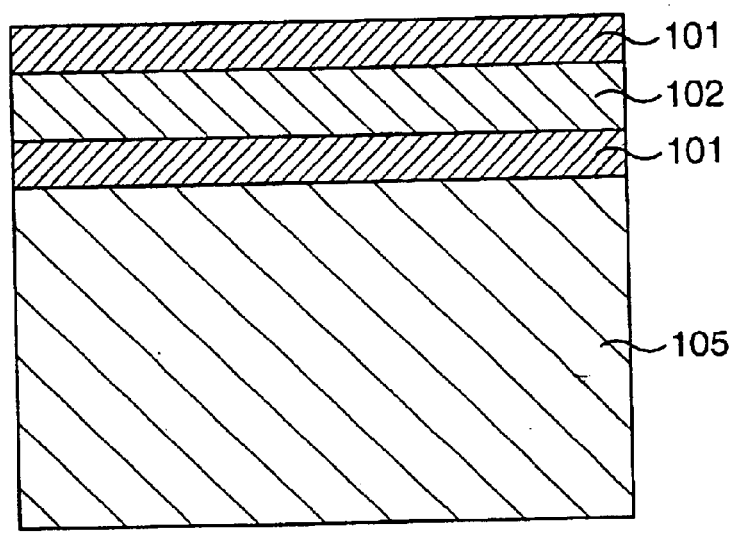
FIG. 5 is a schematic view showing a layer structure of a composite ceramic for oxygen separation when the composite ceramic has a layer structure made of a porous support body, an oxygen exchange layer, an oxide ion diffusion layer, and an oxygen exchange layer according to the present invention.

The composite material that the present invention provides may be a composite material of its four-layer structure in which different oxide ceramics are formed on a porous support body (105) as shown in FIG. 5, for example, in order of the oxygen exchange layer (101), oxide ion diffusion layer (102), and oxygen exchange layer (101) (hereinafter, referred to as "porous support body/oxygen exchange layer/oxide ion diffusion layer/oxygen exchange layer"). In this case, three layers consisting of an oxygen exchange layer, an oxide ion diffusion layer, and an oxygen exchange layer are responsible for oxygen permeation.

Figure 6:
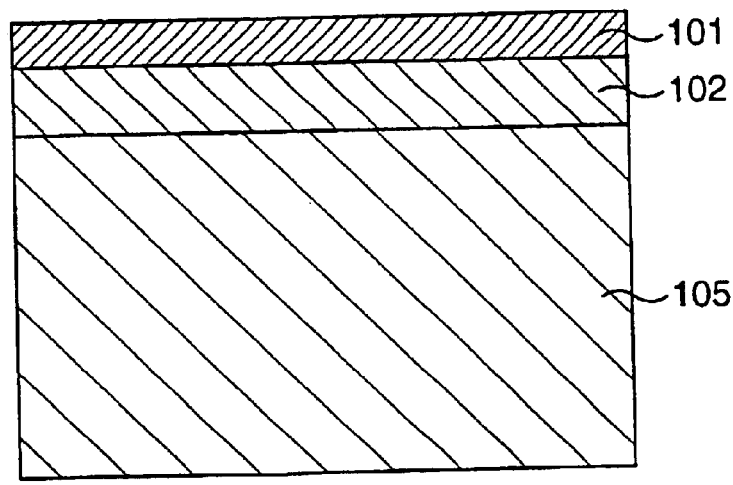
FIG. 6 is a schematic view showing a layer structure of a composite ceramic for oxygen separation when the composite ceramic has a layer structure made of a porous support body, an oxide ion diffusion layer, and an oxygen exchange layer according to the present invention.

In addition, in the case where a porous support body is formed of an oxide with its high oxygen exchange rate, the element itself acts as an oxygen exchange layer. Thus, a composite material of its three-layer structure consisting of a porous support body (105), an oxide ion diffusion layer (102), and an oxygen exchange layer (101) as shown in FIG. 6 also indicates its high oxygen permeation rate.

Now, a material composition suitable to the oxygen exchange layer will be described here. All oxides with their oxygen exchange velocities higher than the oxide of the oxide ion diffusion layer correspond to the material composition suitable to the exchange layer. Among them, the perovskite type oxide has its substantially large oxygen exchange rate in comparison with the metals such as Pt or Pd or metal oxide such as $PrO_2$ that have been conventionally reported, and is particularly suitable as an oxygen exchange layer. The inventors employed a $La_{0.05}Sr_{0.95}CoO_{3-y}$ perovskite type oxide of 100 $\mu$m in thickness as an oxide ion diffusion layer, produced a series of samples, wherein a $La_uSr_{b-u}Fe_vO_{c-v}O_{3-w}$ perovskite type oxide on its surface having u, b, v, and c changed within the range of $0.1 \leq u < 0.5$, $0.9 < b < 1.1$, $0 < v1.1$, and $0.9 < c < 1.1$; and evaluated an oxygen permeation rate. As a result, when 'u' ranged from 0.1 to 0.5, the oxygen permeation rate significantly increased. In addition when $0 < v < 1.1$, the different in oxygen permeation velocities caused by 'v' was hardly observed. At this time, in the $La_uSr_{b-u}Fe_vCo_{c-v}O_{3-w}$, although the value of 'w' is determined by electrical neutralization, this value of 'w' is a composition before subjected to oxygen separation. When this value is actually used for oxygen separation, it may differ slightly depending on this composition. In many cases, an oxygen defect is produced. In addition, in the range in which its oxygen exchange rate is not reduced, another component may be contained.

Although all oxides with their high oxide ion diffusion velocities correspond to the composition of the oxide ion diffusion layer applicable to the present invention, any combination of the dense film and the porous support body described in the section 'b' is applicable. In this application, the "oxide ion diffusion layer" in this section may be the same as the "dense continuous layer" or the "dense film" of the film portion described in the section 'b'.

The oxygen exchange layer is formed on the oxide ion diffusion layer by a variety of techniques such as vacuum vapor deposition, reactive spattering, a chemical gas phase vapor deposition, chemical spraying, or alloy plating oxidization. Alternatively, a slurry pasted by mixing temporarily sintered raw materials with a solvent may be applied and sintered. In particular, in the case where an island shaped or porous oxygen exchange layer is formed, a method employing slurry is preferred. In this method, an amount of slurry applied or sintering time is controlled, whereby the shape of the layer can be controlled.

In order to carry out selective oxygen permeation and separation from a mixture gas containing oxygen by employing a composite material of the present invention, the oxygen potentials on both surface of the composite material may be differentiated. Gastight chambers are provided at both sides of the composite material, the mixture gas containing an oxygen gas is supplied to one of these chambers, and the conditions in both of these chambers are set so that the oxygen partial pressure of the chamber is lower than that of the other chamber. For example, one of the chambers is set to a normal pressure or pressurized, and the other chamber is pressure-reduced or one of the chambers is pressurized, and the other chamber is set to a normal pressure, whereby oxygen with its high purity can be acquired on a low oxygen partial pressure side. The operating temperature of this oxygen separation ranges from 500 to 1000° C. and preferably ranges from 650 to 950° C.

In addition, in a membrane reactor, an oxygen-containing gas such as air may be supplied to one membrane, and a hydrocarbon gas may be supplied to the other membrane. The operating temperature is similar to that of oxygen separation. In this manner, the composite material and ceramic composite of the present invention are applicable to an apparatus of producing pure oxygen, oxygen enriched air or the like. Furthermore, these material and composite is available for use other than oxygen separation, in particular, for use in a chemical reactor involving oxidization reaction. For example, these material and composite is available for use in a reactor for partial oxidization reaction of methane, the reactor producing a synthetic gas consisting of carbon oxide and hydrogen from methane.

Conventionally, there has been employed a reactor in which a synthetic gas is obtained by contact portion oxidization reaction (catalytic reaction) while a mixture gas of methane and oxygen is used as a starting raw material. In a membrane reactor employing the mixed conducting oxide ceramics of the present invention, for example, air (or mixture gas containing oxygen) and methane are separated from each other by the mixture conductive ceramics, and are supplied separately, and a conventional synthetic gas production catalyst such as Rh is disposed on the ceramic surface on which methane is supplied. By heating ceramics, only oxygen permeates in principles similar to oxygen separation, and then, the oxygen reacts with methane on the ceramic surface on which methane is supplied, thereby producing a synthetic gas.

Therefore, unlike the conventional method, there is a great advantageous effect that a synthetic gas can be obtained without a need to separate oxygen in advance from an oxygen-containing raw material gas (oxygen source such as air) and without mixing a component other than oxygen in the oxygen-containing raw material gas (component other than oxygen such as nitrogen when air is employed as an oxygen-containing raw material gas, for example); and further, reaction takes place continuously, thus simplifying the manufacturing apparatus. In addition, the above composite material and ceramics are available for use in every reactor involving oxidization reaction such as partial oxidization of hydrocarbon for forming olefin, partial oxidization of ethane, substitution of aromatic compounds as well as partial oxidization of methane.

EXAMPLES

Hereinafter, Examples of the present invention will be described. These Examples are provided for the illustrative example, and the scope of the present invention is not limited to this content.

Example 1

In this Example, the densifying temperature, crystal structure, linear expansion coefficient, and oxygen permeation rate were evaluated in order to verify that a ceramic composition that the present invention provides is preferable to a porous body or a dense film. As raw materials of samples, there were employed $La_2O_3$, $CaCO_3$, $SrCO_3$, $BaCO_3$, $Fe_2O_3$, $CO_3O_4$, $Nb_2O_5$, $Ta_2O_5$, $CuO$, $ZnO$, $NiO$, $Li_2CO_3$, $MgO$, $Cr_2O_3$, $Ga_2O_3$, $TiO_2$, and $ZrO_2$, a required amount of each of these raw materials was weighted, and a 24-hour ball milling mixture was carried out together with a zirconia ball by employing an isopropyl alcohol as a dispersion catalyst. The obtained slurry was dried, milled, and filled in a MgO based rectangular pod, and temporary sintering was carried out at 850° C. for 12 hours in air. The obtained temporarily sintered powders were milled, were filled in a dice of 12 mm in diameter, were axially molded in tablet shape, were filled in an ice bag, and were subjected to CIP molding. The obtained molded element was sintered in the MgO based rectangular pod at each sintering temperature for 5 hours, and a sintered element of about 10 mm in diameter was obtained.

This sintered body was polished to have its thickness of 1 mm, the polished body was bonded with a tip end of an $Al_2O_3$ tube, the outside of the tube was exposed to air, and the inside of the tube was pressure-reduced. The oxygen partial pressure in the pressure-reducing side was measured, and an oxygen permeation rate was obtained based on a difference from the partial pressure value when the oxygen permeation through the sintered element is absent. The sample temperature was set to 750° C. The measured value was displayed by volume per unit surface area for a mixed conducting oxide, i.e., in standard state of the permeation oxygen per minute, and the unit is defined as $cc/cm^2$ per minute. The evidence of gas leakage through the samples was investigated by employing a helium leakage detector by changing the outside to a mixture gas of air and helium. As a result, no gas leakage was observed in the samples in the scope of the present invention.

Table 1 shows a sample composition; a densifying temperature, the result obtained when a composite phase was identified at room temperature by using powder X-ray refraction technique; the linear heat expansion coefficient ranging from room temperature to 800° C.; and the measured value of the oxygen permeation rate. Here, the densifying temperature indicates a temperature required for setting relative density to 94% or more. In the field of the composite phase, C indicates that a cubic crystal perovskite phase is contained; and H indicates that a $BaNiO_3$ type hexagonal crystal phase is contained.

From Examples 1, 2, and 5 to 8 of Table 1, it is found that the densifying temperature rises with an increase in Nb content. In addition, in comparing Example 5 with Examples 25 to 28, and in comparing Example 18 with Example 19, even if part of Co or Fe is substituted by Cr or Ga or even of part of Nb or Ta is substituted by Ti or Zr, the material properties does not change drastically as long as it is within the scope of the present invention.

It was verified that the material within the scope of the present invention has a high densifying temperature, the cubic crystal perovskite type structure is stable even at room temperature, the linear thermal expansion coefficient is 20 ppm/° C. or more that is close to that of the mixed conducting oxide for a dense film, and the material is suitable to use of a porous body. In addition, this material has its high oxygen permeation rate, and can be fully used as a material for a dense film.

Example 2

In this Example, in order to verify that the characteristics of the porous body of the ceramic composite that the present invention provides are not degraded even after being filmed, a porous body was produced, and further, was subjected to heat treatment at the same temperature when a dense film was formed. Then, the porosity before heat treatment was compared with that after heat treatment. 30 wt % PVa was added to temporarily sintered powders produced in the same way as in Example 1, and mixing and milling was carried out for 2 hours by boll milling. The obtained mixture powder was filled in a dice of 12 mm in diameter, and was axially molded in a tablet shape. Further, the molded powders were filled in an ice bag, and were subjected to CIP molding. The obtained molded element was de-fatted at 450° C. for 5 hours in a MgO based rectangular pot, and further, the de-fatted molded element was sintered for 5 hours at each sintering temperature. A disc shaped porous body of 1 mm was cut out from the obtained sintered body, and the porosity was evaluated. Further, this substrate was subjected to heat treatment at 1200° C. for 5 hours, and the porosity was evaluated again. This heat treatment is based on the condition that is almost same as that for forming the dense film, and a change of the porous body in a process for forming a thin film can be verified.

Table 2 shows a sample composition, a fining temperature of such composition, a sintering temperature when a porous body is produced; and the porosity after sintering and the porosity after heat treatment, respectively. It was judged that, in the case where the porosity after sintering and the porosity after heat treatment are not greater than 20%, such material is unsuitable as a porous body. It was verified that the material within the scope of the present invention meets this condition.

Example 3

In this Example a composite material was actually produced, and its characteristics were checked. First, a disc shaped porous body of 1 mm in thickness was produced in the same manner as in Example 2. On the other hand, temporarily sintered powders were produced in the same manner as in Example 1, the produced powders were dispersed in water to produce a slurry, and the produced slurry was applied to one surface of the porous body, and was dried, and 5-hour sintering was carried out in air. This applying and sintering process was repeated three times or more, a fine mixture conductive ceramic thin film was formed, and a composite material was obtained. Assuming that the thin film was refined to theoretical density, the thickness of the thus formed thin film was calculated based on a weight change in samples before and after a thin film had been formed; a thin film area obtained by the sample shape; and further, theorectical density. The oxygen permeation rate of the obtained composite material was measured in the same manner as in Example 1. In addition, with respect to some of the composite materials, a thin film portion was removed, and the porosity of the porous body after the film portion had been formed was evaluated. In the composite materials within the scope of the present invention, it was verified that the porosity of the porous body was maintained to be within the range of 20% to 80%.

Table 3 shows a composition of a porous body and a dense thin film, a sintering temperature of the porous body, a sintering temperature of the thin film, and the thickness of the thin film, and the measured value of the oxygen permeation rate. In comparing Examples 4 and 6 in Table 3 and Comparative Examples 30 and 31, in the composite material according to the present invention, the oxygen permeation rate is maintained to be high even if the film sintering temperature is changed. In addition, the range in which the composite material can be manufactured is wider than the conventional material of Comparative Examples. In comparing Examples 13 and 14 in Table 3, a case where Nb is contained in a fine thin film is found to be more preferable than a case in which it is not contained, since a higher oxygen permeation rate is observed. In Examples 25 and 26 in Table 3, since the thickness of a thin film was beyond the preferable scope of the present Invention, the oxygen permeation rate was lowered or slight leakage occurred. In addition, in Examples 1 to 3 and 23 and 24 as well, since the composition of a thin film is beyond the preferable scope of the present invention, the oxygen permeation rate was slightly lower in comparison with Examples 4 to 22 and 27 to 29 that are within the preferable scope of the invention.

The composite material within the scope of the present invention clearly indicated excellent oxygen permeation characteristics in comparison with Comparative Examples 30 to 33 in Table 3. As a result, it was verified that a composite material with its high oxygen permeation rate that has been hardly produced in the conventional technique can be easily produced according to the present invention.

Example 4

Disc-shaped samples of the composite materials shown in Examples 22, 28, and 29 in Table 3 were produced in the same manner as in Example 3, its film face side was exposed to air atmosphere of 850° C., and its porous face side was exposed to 50% $CH_4$—Ar mixture has atmosphere of 850° C., whereby the reduction and breakage resistances under a low oxygen partial pressure were investigated. In these materials, the compositions of both of the porous support body and the film were within the scope that is particularly excellent in reduction resistance. Even if the composite material of the present invention was maintained under the foregoing condition for 10 hours or more, no leakage of component Ar was observed. Next, the film face side was changed to the 50% $CH_4$—Ar mixture gas atmosphere, and the porous body side was changed to 850° C. air atmosphere, and the reduction and breakage resistances were investigated in the same manner as previously. In this case as well, no leakage of component Ar was observed. The 50% $CH_4$—Ar mixture gas side atmosphere is set to low oxygen partial pressure. If cracks occur with a film due to reduction of the film material and/or porous material, the component A should leakage. However, since no leakage was observed, it was found that the ceramic composite and composite material of the present invention has excellent reduction and breakage resistances. In this manner, it was verified that the ceramic composite and composite material of the present invention is preferable to use of the membrane reactor.

Example 5

In this Example, in order to verify that the characteristics of porous body that the present invention provides are not degraded even after being filmed, a porous body was produced, and was further subjected to heat treatment at the same temperature when a dense film is formed. Then, the porosity before heat treatment was compared with that after heat treatment. As raw materials of samples. $CaCo_3$, $SrCO_3$, $BaCO_3$, $Fe_2O_3$, and $CO_3O_4$ were employed, and a required amount of a respective one of these samples was weighted. Then, 24-hour boll milling mixture was carried out together with zirconia while an isopropyl alcohol was employed as a dispersion catalyst. The obtained slurry was dried and milled, and filled in a Mg based rectangular pod, and was subjected to temporary sintering at 850° for 12 hours in air. PVA of 30 wt. % was added to the obtained temporarily sintered powders, and mixing and milling was carried out for 2 hours by ball milling. The obtained mixture powders were filled in a dice of 12 mm in diameter, was axially molded, and further, was filled in an ice bag, and was subjected to CIP molding. The obtained molded element was de-fatted at 450° C. for 5 hours in a MgO based rectangular pot, and further, the de-fatted molded body was sintered for 5 hours at each sintering temperature. A disc shaped porous body of 1 mm was cut out from the obtained sintered and the porosity was evaluated. Further, this substrate was subjected to heat treatment at 1200' for 5 hours, and the porosity was evaluated again. This heat treatment is based on the condition that is almost same as that for forming the dense film, and a change of the porous body in a process for forming a thin film can be verified. Table 4 shows a sample composition, a fining temperature of such composition, a sintering temperature when a porous body is produced; and the porosity after sintering and the porosity after heat treatment, respectively. It was judged that, in the case where the porosity after sintering and the porosity after heat treatment are not greater than 20%, such material is unsuitable as a porous body. It was verified that the material within the scope of the present invention meets this condition.

Example 6

In this Example, a composite material was actually fabricated, and its characteristics were checked. First, a disc shaped porous body of 1 mm in thickness was produced in the same manner as in Example 5. On the other hand, temporarily sintered powders were produced in the same manner as in Example 1 ($La_2O_3$ was used as a raw material of La). The produced powders were dispersed in a solvent to produce a slurry, the produced slurry was applied to one surface of the porous body, was dried, and was subjected to 5-hour sintering in air. This applying and sintering process was repeated three times, a fine mixed conducting oxide ceramic thin film was formed and a composite material was obtained. Assuming that the thin film was refined to theoretical density, the thickness of the formed thin film was calculated by a weight change in samples before and after the thin film had been formed; a thin film area obtained by the shape of samples, and further, theoretical density. In addition, with respect to some of the composite materials, thin film portions were removed, and the porosity of the porous body after the film portion had been formed was evaluated. In the composite materials within the scope of the present invention, it was verified that the porosity of the porous body is maintained within the range of 20% to 80%.

The oxygen permeation rate of the obtained composite material and the presence or absence of gas leakage were measured in the same manner as in Example 1. As a result, it was verified that no gas leakage occurs with the composite materials embodied in the present invention, and the film formed on the porous body is gastight.

Table 5 shows a composition of a porous body and a dense thin film; a sintering temperature of the porous body and the thin film; thickness of the thin film, and the measured value of the oxygen permeation rate. As a result of these tests, it was verified that the composite materials within the range of the present invention indicate their excellent oxygen permeation characteristics.

Example 7

This Example specifically presents an oxygen permeation rate when oxygen exchange layers in the form of a dense film was formed at both sides of an oxide ion diffusion layer of 32 $\mu$m to 3.2 mm in thickness range. In the case where the oxide R ion diffusion layer is thin, there was provided a four-layer structure in which a porous support body (105), an oxygen exchange layer (101), an oxide ion diffusion layer (102), and an oxygen exchange layer (101) are formed In order, as shown in FIG. 5. In the case where the oxide ion diffusion layer (102) is relatively thick, there was provided a three-layer structure in which the oxygen exchange layers (101) were arranged at both sides of the oxide ion diffusion layer (102) that consists of a thin sheet cut out of the sintered element, as shown in FIG. 1.

Now, a method of producing a porous support body will be described here. A strontium carbonate and $Fe_2O_3$ were weighted to produce $SrFeO_{3-w}$, and the product was mixed with an isopropyl alcohol by ball milling. The mixture was dried to remove the isopropyl alcohol, and was temporarily sintered at 900° C. for 12 hours. The obtained temporarily sintered powder was mixed with PVA, and was molded in a cylindrical disk shape of 14 mm in diameter and 3 mm in height. Then, the molded material was sintered in air at 1200° C. for 5 hours. Further, both bottom surfaces of the cylindrical disc were polished by sand paper to produce a cylindrical disk of 1 mm in thickness. Then, the produced disk was ultrasonically washed in an ethanol solvent.

Now, a method of producing a thin-film oxide ion diffusion layer on the porous support body will be described here. First, a lanthanum oxide, a strontium carbonate and $CO_3O_4$ were weighted to produce $La_{0.05}Sr_{0.95}Co_{3-v}$, and the product was mixed together with an isopropyl alcohol by ball milling. The mixture was dried to remove the isopropyl alcohol, and was temporarily sintered in air at 900° C. for 12 hours. Further, a solvent in which ethyl Carbitol and ethyl cellulose were mixed and stirred was produced, and a slurry blended with the above temporarily sintered powders was produced. Further, the slurry was applied onto a porous support body that had been produced in advance, and the porous support body was sintered in air at 1200° C. for 5 hours. However, in this Example, oxygen exchange layers were formed on both sides of an oxide ion diffusion layer. Thus, an oxygen exchange layer was formed on a porous ceramic substrate, on which the oxide ion diffusion layer was formed. In this Example, the thickness of the finished oxide ion diffusion layer was defined as 32, 63, 100, or 200 $\mu$m.

Now, a method of producing an oxide ion diffusion layer that consists of a sintered body will be described here. First, a lanthanum oxide, a strontium carbonate and cobalt tetra tri-oxide were weighted to produce $La_{0.5}Sr_{0.95}Co_{3-w}$, and the product was mixed together with an isopropyl alcohol by ball milling. The mixture was dried to remove the isopropyl alcohol, and was temporarily sintered in air at 900° C. for 12 hours. The obtained temporarily sintered powder was molded in a cylindrical disk shape of 14 mm in diameter and 3.5 mm in height, and was temporarily sintered in air at 1200° C. for 5 hours. The rate of temperature rise and fall was 120° C. per hour. The sintered element was sliced in desired thickness, and then, the surface was flattened by sand paper. In this Example, the oxygen permeation rate was evaluated relevant to three types of cylindrical disk shaped samples of 0.5 mm, 1.0 mm, and 3.2 mm in thickness of the oxide ion diffusion layer.

Lastly, a method of forming an oxygen exchange layer that comprises a composition of $La_{0.3}Sr_{0.7}Fe_{0.8}Co_{0.2}O_{3-w}$ will be described here. A lanthanum oxide, a strontium carbonate and cobalt tetra tri-oxide were weighted to produce $La_{0.3}Sr_{0.7}Fe_{0.8}Co_{0.2}O_{3-w}$, and the product was mixed together with an isopropyl alcohol by ball milling. The mixture was dried to remove the isopropyl alcohol, and was temporarily sintered in air at 900° C. for 12 hours. Further, a solvent in which ethyl Carbitol and ethyl cellulose were mixed and stirred was produced, and a slurry blended with the above temporarily sintered powders were produced. Here, oxygen exchange layers were formed at both sides of the oxide ion diffusion layer. Therefore, the above slurry was applied onto a porous support body of its cylindrical disc shape that has been produced in advance, and the support body was sintered in air 1200° C. for 5 hours. After the oxide ion diffusion layer was formed on it, the slurry was applied onto the oxide ion diffusion layer and the support body was sintered in air 1200° C. for 5 hours. In this case, the thickness of the oxygen exchange layer was 5 μm, and the shape of the layer was a dense film.

Figure 7:
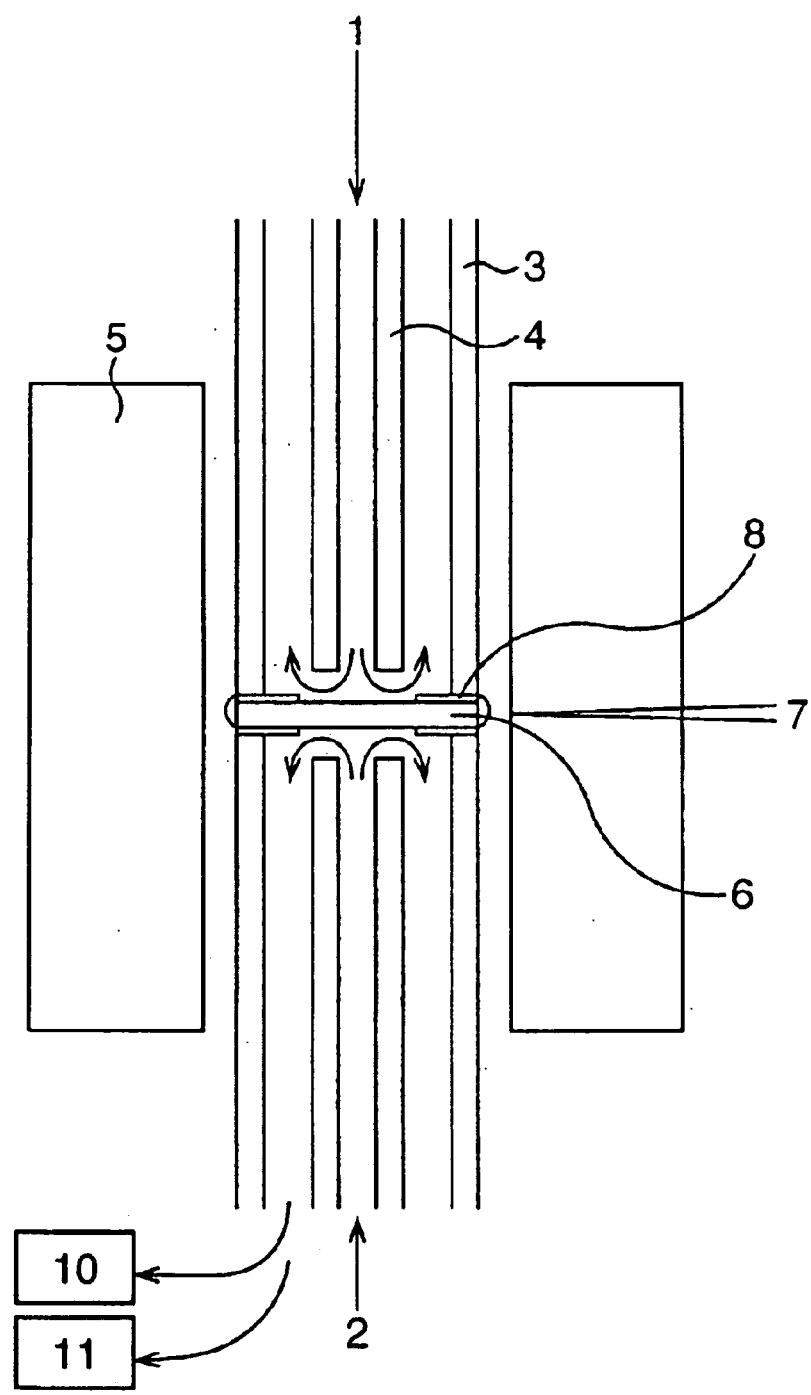
FIG. 7 is a schematic view showing an apparatus employed for evaluating an oxygen permeation rate of a solid electrolyte.

The oxygen permeation rate was evaluated by using an instrument shown in FIG. 7. At a high oxygen partial pressure side (incoming side), mixture gas of 21% oxygen and 79% helium was introduced from an oxygen-containing mixture gas inlet 1 at a rate of 40 cc per minutes. At a low oxygen partial pressure side (outgoing side), an argon gas with its high purity was introduced from an argon inlet 2. The foregoing cylindrical disc shaped sample 6 was set by a glass seal 8 and a glass side seal 9 so as to maintain gastightness relevant to the incoming side and outgoing side. It was verified that an oxide ion diffusion layer in the sample 6 is a dense body that is completely free from gas leakage by gas analyzing an ejected argon gas by employing a fourfold mass analyzer 11, whereby helium gas is not detected. In addition, in order to discriminate the passing oxygen from the oxygen in air that invades in the middle of a gas line, 100% helium was introduced at the incoming side, and argon was introduced at the outgoing side. Then, the oxygen density in the measured argon was subtracted as a background. Then, the sample was heated by an electric furnace 5, and 850° C., an incoming oxygen partial pressure of 0.21 atm and an outgoing oxygen partial pressure of 0.01 atm were defined as standard measurement conditions. However, with respect to the cylindrical disk shaped sample in which the oxygen exchange layer, oxide ion diffusion layer, and oxygen exchange layer were formed on the porous support body, the three-layer film portion was disposed at the low oxygen partial pressure side in FIG. 7.

Figure 8:
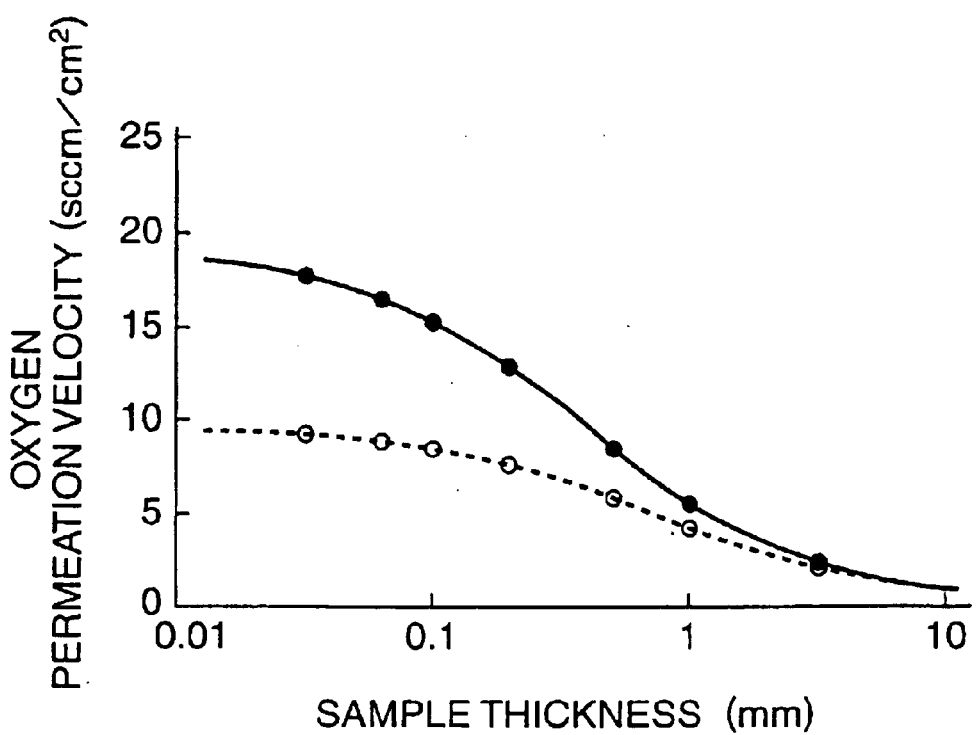
FIG. 8 is a graph showing an oxygen permeation rate of a composite material when dense $La_{0.3}Sr_{0.7}Fe_{0.8}O_{3-w}$ oxygen exchange layers of 10 μm in thickness are formed on both surfaces of a $La_{0.05}Sr_{0.95}CoO_{3-w}$ oxide ion diffusion layer.

FIG. 8 shows an oxygen exchange rate that was evaluated for each of the above samples (seven types of the film thickness of the oxide ion exchange layer: 32 μm, 63 μm, 100 μm, 200 μm, 0.5 mm, 1.0 mm, and 3.2 mm; and all 5 micron dense films of the oxygen exchange layer). The filled circle indicates the actually measured value. As a Comparative Example, there was shown by open circle the result of the oxygen permeation rate that was evaluated for each sample of only the oxide ion diffusion layer free of an oxygen exchange layer. As is evident from FIG. 8, in the Comparative Example free of an oxygen exchange layer, the oxygen permeation rate starts saturation in samples of 1 mm or less in thickness of the oxide ion diffusion layer. The rate saturates almost completely in thickness of about 100 μm or less. As a result, an effect of thinning the oxygen diffusion layer is eliminated. On the other hand, in the samples each having an oxygen exchange layer formed thereon, even if the film thickness of the oxide ion diffusion layer is 1 mm or less, the oxygen permeation rate increases in proportion to the film thickness, and an increase in oxygen permeation rate according to an advantageous effect of the present invention is significant. In the case where the film thickness of the oxide ion diffusion layer is 32 μm, the oxygen permeation rate of the sample according to the present invention was about twice as high as that of Comparative Example.

Example 8

This Example specifically presents a respective one of the oxygen permeation velocities when oxygen exchange layers are formed in the shape of a dense film, a discontinuous film in island shape, or a porous shape at both sides of an oxide ion diffusion of 100 μm in thickness. As this sample, there was employed a composite material of its four-layer structure as shown in FIG. 5, wherein a porous support body (105), an oxygen exchange layer (101), an oxide ion diffusion layer (102), and an oxygen exchange layer (101) are formed in order. As a Comparative Example, there was employed a material free of an oxygen exchange layer, the material having its double structure in which a porous support body and an oxide ion diffusion layer are formed.

Table 6 summaries the layer structure of the composite material evaluated in this Example and the oxygen permeation rate of each material. In all samples containing the Comparative Example, the support body is a porous body of 2 mm in thickness and $SrFeO_{3-w}$ in composition, and the oxide ion diffusion layer is a dense thin film of 100 μm in thickness and $La_{0.05}Sr_{0.95}Co_{3-w}$ in composition. The composition of the oxygen exchange layer was defined as $La_{0.3}Sr_{0.7}Fe_{0.5}Co_{0.5}O_{3-w}$, and an effect achieved by changing its shape was shown.

A porous support body and a thin-film shaped oxide ion diffusion layer formed thereon were produced in the same manner as in Example 7. An oxygen exchange layer was also produced by using a method of applying a slurry of temporarily sintered powders as in Example 7. The material was controlled in the form of a dense film, a discontinuous film in island shape, or a porous film according to the applying quantity and sintering temperature. In this Example, the thickness of an oxygen exchange layer that has the shape of dense film was 5 μm. The thickness of the porous oxygen exchange layer was 30 μm, the porosity was 30%, and the average radium of the pore was 2 μm. In addition, the thickness of the oxygen exchange layer that consists of a discontinuous film of its island shape was 10 μm, and the average radium of the island was 20 μm.

In this Example, in all the samples having a surface exchange layer formed thereon, it was verified that the oxygen permeation rate increases more significantly than the Comparative Example in which no oxygen exchange layer is provided. Among them, in the case where the oxygen exchange layer was a porous film, the highest oxygen permeation rate was obtained, which was 6.7 times as high as that of the Comparative Example. As a result, a highly advantageous effect of forming an oxygen exchange layer was achieved.

Example 9

This Example specifically presents a respective one of the oxygen permeation velocities when porous oxygen exchange layers consisting of various compositions are formed on both sides of an oxide ion diffusion layer of 120 μm in thickness. This sample was a composite material of its four-layer structure as shown in FIG. 5, wherein a porous support body (105), an oxygen exchange layer (101), an oxide ion diffusion layer (102), and an oxygen exchange layer (101) were formed in order. As a Comparative Example, there was employed a material free of an oxygen exchange layer, the material having a two-layer structure of a porous support body and an oxide ion diffusion layer.

Table 7 summaries the layer structure of the composite material evaluated in this Example and the oxygen permeation rate of each material. In all samples containing the Comparative Example, the support body is a porous body of 2 mm in thickness and $SrFeO_{3-w}$ in composition, and the oxide ion diffusion layer is a fine thin film of 120 μm in thickness and $La_{0.1}Ba_{0.9}Fe_{0.1}Co_{0.9}O_{3-w}$ in composition. There was shown an effect achieved by the disposition of each composition when the shape of the oxygen exchange layer was porous, and the composition of the oxygen exchange layer was defined as $La_{0.2}Sr_{0.8}CoO_{3-w}$ or $La_{0.4}Sr_{0.6}CoO_{3-w}$.

The porous support body and the thin-film oxide ion diffusion layer formed thereon were produced in the same manner as in Examples 7 and 8.

In this Example, in all the samples each having a surface exchange layer formed thereon, it was verified that the oxygen permeation rate increases more significantly than that in Comparative Example free of an oxygen exchange layer. Among them, in the case where $La_{0.2}Sr_{0.8}CoO_{3-w}$ is disposed in the oxygen exchange layer on the high oxygen partial pressure side, and $La_{0.4}Sr_{0.6}CoO_{3-w}$ is disposed in the oxygen exchange layer on the low oxygen partial pressure side, the highest oxygen permeation rate was produced, which was 6.7 as high as that of Comparative Example. As a result, a highly advantageous effect of forming an oxygen exchange layer was achieved. In the case where the composition of the oxygen exchange layer was disposed oppositely, an effect of forming an oxygen exchange layer was 5.5 as high as that in Comparative Example.

Example 10

This Example discusses a composite material in which a composition of a porous support body is changed, and the support body attains an effect of an oxygen exchange layer.

Table 8 summaries the layer structure of a composite material evaluated in this Example and the oxygen permeation rate of each material. In Example c-4-2 in Table 8, a porous support body was produced by a composite oxide of its same composition as the oxygen exchange layer 2 shown in Example c-4-1. A material free of an oxygen exchange layer, the material having a two-layer structure of a porous support body and an oxide ion diffusion layer was employed in Comparative Example.

The porous support body and the thin-film oxide ion diffusion layer formed thereon were produced in the same manner as in Examples 7 and 8.

In Examples c-4-1 and c-4-2 shown in Table 8, it was verified that the oxygen permeation rate increases by 8 times as high as that of Comparative Example free of an oxygen exchange layer. However, the oxygen permeation velocities of Examples c-4-1 and c-4-2 are almost equal to each other. Thus, it is believed that a function serving as an oxygen exchange layer can be provided at the porous support body by selecting a composition of the porous support body.

Example 11

This Example discusses a composite material in which an oxygen exchange layer is added to a material that consists of a combination of the porous support body and the fine thin film that were presented in Example 5.

Table 9 summaries the layer structure of the composite material evaluated in this Example and the oxygen permeation rate of each material. In Table 9. Examples c-5-1, c-5-2, c-5-3, c-5-4, and c-5-5 were 4.3 to 5.6 times as high as Comparative Examples c-5-2, c-5-3, c-5-4, and c-5-5, respectively.

TABLE 1

| | FORMULA | DENSIFYING TEMPERATURE (° C.) | PHASE | LINEAR EXPANSION COEFFICIENT (ppm/° C.) | OXYGEN PERMEATION RATE (cc/cm² · min) |
|---|---|---|---|---|---|
| EXAMPLE | | | | | |
| 1 | $Sr(Co_{0.98})(Nb_{0.02})O_{(3-\delta)}$ | 1225 | C | 26 | 3.2 |
| 2 | $Sr(Co_{0.85})(Nb_{0.05})O_{(3-\delta)}$ | 1250 | C | 25 | 4.0 |
| 3 | $(Sr_{0.8}Ca_{0.2})(Co_{0.95})(Nb_{0.05})O_{(3-\delta)}$ | 1250 | C | 25 | 4.4 |
| 4 | $(Sr_{0.8}Ba_{0.2})(Co_{0.95})(Nb_{0.05})O_{(3-\delta)}$ | 1250 | C | 25 | 3.6 |
| 5 | $Sr(Co_{0.9})(Nb_{0.1})O_{(3-\delta)}$ | 1275 | C | 23 | 4.0 |
| 6 | $Sr(Co_{0.8})(Nb_{0.2})O_{(3-\delta)}$ | 1300 | C | 23 | 2.4 |
| 7 | $Sr(Co_{0.6})(Nb_{0.4})O_{(3-\delta)}$ | 1350 | C | 22 | 2.0 |
| 8 | $Sr(Co_{0.5})(Nb_{0.5})O_{(3-\delta)}$ | 1375 | C | 21 | 1.6 |
| 9 | $Sr(Fe_{0.95})(Nb_{0.05})O_{(3-\delta)}$ | 1250 | C | 22 | 2.4 |
| 10 | $Sr(Fe_{0.9})(Nb_{0.1})O_{(3-\delta)}$ | 1350 | C | 22 | 2.8 |
| 11 | $Sr(Co_{0.7}Fe_{0.2})(Nb_{0.1})O_{(3-\delta)}$ | 1300 | C | 23 | 3.2 |
| 12 | $Sr(Co_{0.71}Fe_{0.2})(Nb_{0.1})O_{(3-\delta)}$ | 1300 | C | 23 | 3.2 |
| 13 | $Sr(Co_{0.7}Fe_{0.19})(Nb_{0.1})O_{(3-\delta)}$ | 1300 | C | 23 | 3.2 |
| 14 | $Sr(Co_{0.9})(Ta_{0.1})O_{(3-\delta)}$ | 1275 | C | 22 | 3.6 |
| 15 | $Sr(Co_{0.8})(Ta_{0.2})O_{(3-\delta)}$ | 1300 | C | 21 | 2.8 |
| 16 | $Sr(Co_{0.4}Fe_{0.4})(Nb_{0.1}Ta_{0.1})O_{(3-\delta)}$ | 1325 | C | 22 | 2.4 |
| 17 | $(La_{0.2}Sr_{0.8})(Co_{0.8}Fe_{0.1})(Nb_{0.1})O_{(3-\delta)}$ | 1275 | C | 22 | 1.6 |
| 18 | $(La_{0.2}Sr_{0.8})(Co_{0.7}Fe_{0.1})(Nb_{0.1})(Cu_{0.1})O_{(3-\delta)}$ | 1250 | C | 22 | 2.8 |
| 19 | $Sr(Co_{0.9})(Nb_{0.05})(Cu_{0.05})O_{(3-\delta)}$ | 1225 | C | 22 | 4.8 |
| 20 | $Sr(Co_{0.9})(Nb_{0.05})(Zn_{0.05})O_{(3-\delta)}$ | 1225 | C | 23 | 4.4 |
| 21 | $Sr(Co_{0.9})(Nb_{0.05})(Ni_{0.05})O_{(3-\delta)}$ | 1225 | C | 23 | 4.0 |
| 22 | $Sr(Co_{0.9})(Nb_{0.05})(Li_{0.05})O_{(3-\delta)}$ | 1225 | C | 23 | 4.0 |
| 23 | $Sr(Co_{0.9})(Nb_{0.05})(Mg_{0.05})O_{(3-\delta)}$ | 1225 | C | 23 | 4.0 |
| 24 | $Sr(Fe_{0.9})(Nb_{0.05})(Cu_{0.05})O_{(3-\delta)}$ | 1225 | C | 22 | 3.6 |
| 25 | $Sr(Co_{0.72}Cr_{0.16})(Nb_{0.1})O_{(3-\delta)}$ | 1275 | C | 23 | 3.9 |
| 26 | $Sr(Co_{0.8}Cr_{0.09}Ga_{0.01})(Nb_{0.1})O_{(3-\delta)}$ | 1275 | C | 23 | 4.1 |
| 27 | $Sr(Co_{0.9})(Nb_{0.08}Zr_{0.02})O_{(3-\delta)}$ | 1275 | C | 23 | 4.0 |
| 28 | $Sr(Co_{0.9})(Nb_{0.08}Zr_{0.01}Ti_{0.01})O_{(3-\delta)}$ | 1275 | C | 23 | 4.0 |
| 29 | $(La_{0.2}Sr_{0.8})(Co_{0.8}Fe_{0.1}Cr_{0.08}Ga_{0.02})(Nb_{0.04}Ta_{0.02}Ti_{0.01}Zr_{0.01})(Cu_{0.1})O_{(3-\delta)}$ | 1250 | C | 22 | 3.0 |
| 30 | $Sr(Co_{0.08}Fe_{0.82})(Nb_{0.1})O_{(3-\delta)}$ | 1350 | C | 22 | 2.9 |

TABLE 1-continued

| | FORMULA | DENSIFYING TEMPERATURE (° C.) | PHASE | LINEAR EXPANSION COEFFICIENT (ppm/° C.) | OXYGEN PERMEATION RATE (cc/cm$^2$ · min) |
|---|---|---|---|---|---|
| 31 | $Sr(Co_{0.08}Fe_{0.67}Cr_{0.15}Ga_{0.02})(Nb_{0.1})O_{(3-\delta)}$ | 1350 | C | 22 | 3.0 |
| 32 | $Sr(Co_{0.01}Fe_{0.85}Cr_{0.01}Ga_{0.01})$ $(Nb_{0.05}Ta_{0.02}Ti_{0.01}Zr_{0.01})(Zn_{0.01}Mg_{0.01}Li_{0.01})O_{(3-\delta)}$ | 1350 | C | 22 | 3.2 |
| COMPARATIVE EXAMPLE | | | | | |
| 33 | $Sr(Co_{0.4})(Nb_{0.6})O_{(3-\delta)}$ | 1375 | SECOND PHASE APPEARED | 16 | 0.4 |
| 34 | $Sr(Co_{0.6})(Nb_{0.1})(Cu_{0.3})O_{(3-\delta)}$ | 1225 | H | 19 | 2.4 |
| 35 | $(La_{0.3}Sr_{0.7})(Co_{0.9})(Nb_{0.1})O_{(3-\delta)}$ | 1275 | C | 22 | 0.8 |
| 36 | $Sr(Co_{0.43}Fe_{0.4})(Nb_{0.2})O_{(3-\delta)}$ | 1325 | SECOND PHASE APPEARED | 18 | 1.2 |
| 37 | $Sr(Co_{0.4}Fe_{0.37})(Nb_{0.2})O_{(3-\delta)}$ | 1325 | SECOND PHASE APPEARED | 18 | 0.8 |

TABLE 2

| | FORMULA | DENSIFYING TEMPERATURE (° C.) | BURNING TEMPERATURE (° C.) | POROUSNESS | |
|---|---|---|---|---|---|
| | | | | AFTER BURNING (%) | AFTER HEAT TREATMENT (%) |
| EXAMPLE | | | | | |
| 1 | $Sr(Co_{0.95})(Nb_{0.05})O_{(3-\delta)}$ | 1250 | 1225 | 40 | 40 |
| 2 | $Sr(Co_{0.9})(Nb_{0.1})O_{(3-\delta)}$ | 1275 | 1250 | 45 | 45 |
| 3 | $(Sr_{0.8}Ca_{0.2})(Co_{0.9})(Nb_{0.1})O_{(3-\delta)}$ | 1275 | 1250 | 44 | 44 |
| 4 | $(Sr_{0.8}Ba_{0.2})(Co_{0.9})(Nb_{0.1})O_{(3-\delta)}$ | 1275 | 1250 | 46 | 45 |
| 5 | $Sr(Co_{0.8})(Nb_{0.2})O_{(3-\delta)}$ | 1300 | 1250 | 42 | 42 |
| 6 | $Sr(Co_{0.5})(Nb_{0.5})O_{(3-\delta)}$ | 1375 | 1300 | 50 | 50 |
| 7 | $Sr(Fe_{0.95})(Nb_{0.05})O_{(3-\delta)}$ | 1250 | 1200 | 43 | 41 |
| 8 | $Sr(Fe_{0.9})(Nb_{0.1})O_{(3-\delta)}$ | 1350 | 1300 | 41 | 41 |
| 9 | $Sr(Co_{0.7}Fe_{0.2})(Nb_{0.1})O_{(3-\delta)}$ | 1300 | 1250 | 47 | 46 |
| 10 | $Sr(Co_{0.71}Fe_{0.2})(Nb_{0.1})O_{(3-\delta)}$ | 1300 | 1250 | 45 | 45 |
| 11 | $Sr(Co_{0.7}Fe_{0.19})(Nb_{0.1})O_{(3-\delta)}$ | 1300 | 1250 | 46 | 45 |
| 12 | $Sr(Co_{0.9})(Ta_{0.1})O_{(3-\delta)}$ | 1275 | 1250 | 47 | 46 |
| 13 | $Sr(Co_{0.8})(Ta_{0.2})O_{(3-\delta)}$ | 1300 | 1250 | 48 | 48 |
| 14 | $Sr(Co_{0.4}Fe_{0.4})(Nb_{0.1}Ta_{0.1})O_{(3-\delta)}$ | 1325 | 1250 | 50 | 50 |
| 15 | $Sr(Co_{0.9})(Nb_{0.05})(Cu_{0.05})O_{(3-\delta)}$ | 1225 | 1200 | 39 | 39 |
| 16 | $Sr(Co_{0.9})(Nb_{0.05})(Zn_{0.05})O_{(3-\delta)}$ | 1225 | 1200 | 40 | 39 |
| 17 | $Sr(Co_{0.9})(Nb_{0.05})(Ni_{0.05})O_{(3-\delta)}$ | 1225 | 1200 | 40 | 40 |
| 18 | $Sr(Co_{0.9})(Nb_{0.05})(Li_{0.05})O_{(3-\delta)}$ | 1225 | 1200 | 39 | 39 |
| 19 | $Sr(Co_{0.9})(Nb_{0.05})(Mg_{0.05})O_{(3-\delta)}$ | 1225 | 1200 | 40 | 39 |
| 20 | $(La_{0.2}Sr_{0.8})(Co_{0.8}Fe_{0.1})(Nb_{0.1})O_{(3-\delta)}$ | 1275 | 1250 | 43 | 42 |
| 21 | $(La_{0.2}Sr_{0.8})(Co_{0.7}Fe_{0.1})(Nb_{0.1})(Cu_{0.1})O_{(3-\delta)}$ | 1250 | 1200 | 41 | 41 |
| 22 | $Sr(Co_{0.72}Cr_{0.18})(Nb_{0.1})O_{(3-\delta)}$ | 1275 | 1250 | 45 | 45 |
| 23 | $Sr(Co_{0.8}Cr_{0.09}Ga_{0.01})(Nb_{0.1})O_{(3-\delta)}$ | 1275 | 1250 | 45 | 45 |
| 24 | $Sr(Co_{0.9})(Nb_{0.08}Zr_{0.02})O_{(3-\delta)}$ | 1275 | 1250 | 45 | 45 |
| 25 | $Sr(Co_{0.9})(Nb_{0.08}Zr_{0.01}Ti_{0.01})O_{(3-\delta)}$ | 1275 | 1250 | 45 | 45 |
| 26 | $(La_{0.2}Sr_{0.8})(Co_{0.6}Fe_{0.1}Cr_{0.08}Ga_{0.02})$ $(Nb_{0.06}Ta_{0.02}Ti_{0.01}Zr_{0.01})(Cu_{0.1})O_{(3-\delta)}$ | 1250 | 1200 | 41 | 41 |
| 27 | $Sr(Co_{0.08}Fe_{0.82})(Nb_{0.1})O_{(3-\delta)}$ | 1350 | 1300 | 41 | 41 |
| 28 | $Sr(Co_{0.08}Fe_{0.67}Cr_{0.15}Ga_{0.02})(Nb_{0.1})O_{(3-\delta)}$ | 1350 | 1300 | 41 | 41 |
| 29 | $Sr(Co_{0.01}Fe_{0.85}Cr_{0.01}Ga_{0.01})$ $(Nb_{0.08}Ta_{0.02}Ti_{0.01}Zr_{0.01})(Zn_{0.01}Mg_{0.01}Li_{0.01})O_{(3-\delta)}$ | 1350 | 1300 | 41 | 41 |
| COMPARATIVE EXAMPLE | | | | | |
| 30 | $(La_{0.2}Sr_{0.8})(Co_{0.8}Fe_{0.2})O_{(3-\delta)}$ | 1200 | 1150 | 45 | 18 |
| 31 | $(La_{0.2}Sr_{0.8})(Co_{0.8}Fe_{0.2})O_{(3-\delta)}$ | 1200 | 1200 | 25 | 18 |
| 32 | $(La_{0.2}Sr_{0.8})(Co_{0.8}Fe_{0.2})O_{(3-\delta)}$ | 1200 | 1250 | 16 | 16 |

TABLE 3

| | | | DENSIFYING TEMPERATURE FOR MATERIAL (° C.) | | | | BURNING TEMPERATURE FOR BODY (° C.) | BURNING TEMPERATURE FOR THIN FILM (° C.) | THICKNESS OF THIN FILM (μm) | OXYGEN PERMEATION VELOCITY (cc/cm² · min) |
|---|---|---|---|---|---|---|---|---|---|---|
| | POROUS SUPPORT BODY | DENSE THIN FILM | POROUS SUPPORT BODY | DENSE THIN FILM | DIFFERENCE IN DENSIFYING TEMPERATURE | | | | | |

| EXAMPLE | | | | | | | | | | |
|---|---|---|---|---|---|---|---|---|---|---|
| 1 | $Sr(Co_{0.9})(Nb_{0.1})O_{(3-\delta)}$ | $(La_{0.3}Sr_{0.7})CoO_{(3-\delta)}$ | 1275 | 1200 | | 75 | 1250 | 1200 | 100 | 3.0 |
| 2 | $Sr(Co_{0.9})(Nb_{0.1})O_{(3-\delta)}$ | $(La_{0.3}Sr_{0.7})(Co_{0.5}Fe_{0.5})O_{(3-\delta)}$ | 1275 | 1200 | | 75 | 1250 | 1200 | 100 | 3.0 |
| 3 | $Sr(Co_{0.9})(Nb_{0.1})O_{(3-\delta)}$ | $Sr(Co_{0.45}Fe_{0.48})O_{(3-\delta)}$ | 1275 | 1200 | | 75 | 1250 | 1200 | 100 | 3.0 |
| 4 | $Sr(Co_{0.9})(Nb_{0.1})O_{(3-\delta)}$ | $(La_{0.05}Sr_{0.95})CoO_{(3-\delta)}$ | 1275 | 1200 | | 75 | 1250 | 1200 | 100 | 7.5 |
| 5 | $Sr(Co_{0.9})(Nb_{0.1})O_{(3-\delta)}$ | $(La_{0.05}Sr_{0.95})CoO_{(3-\delta)}$ | 1275 | 1200 | | 75 | 1250 | 1200 | 20 | 12.0 |
| 6 | $Sr(Co_{0.9})(Nb_{0.1})O_{(3-\delta)}$ | $(La_{0.05}Sr_{0.95})CoO_{(3-\delta)}$ | 1275 | 1200 | | 75 | 1250 | 1225 | 100 | 7.0 |
| 7 | $Sr(Co_{0.9})(Nb_{0.1})O_{(3-\delta)}$ | $(La_{0.1}Sr_{0.9})(Co_{0.5}Fe_{0.5})O_{(3-\delta)}$ | 1275 | 1200 | | 75 | 1250 | 1200 | 100 | 4.0 |
| 8 | $Sr(Co_{0.9})(Nb_{0.1})O_{(3-\delta)}$ | $Sr(Co_{0.5}Fe_{0.5})O_{(3-\delta)}$ | 1275 | 1200 | | 75 | 1250 | 1200 | 100 | 4.5 |
| 9 | $Sr(Co_{0.9})(Ta_{0.1})O_{(3-\delta)}$ | $Sr(Co_{0.51}Fe_{0.5})O_{(3-\delta)}$ | 1275 | 1200 | | 75 | 1250 | 1200 | 100 | 4.0 |
| 10 | $Sr(Co_{0.9})(Ta_{0.1})O_{(3-\delta)}$ | $Sr(Co_{0.5}Fe_{0.48})O_{(3-\delta)}$ | 1275 | 1200 | | 75 | 1250 | 1200 | 100 | 4.0 |
| 11 | $Sr(Co_{0.9})(Nb_{0.1})O_{(3-\delta)}$ | $Sr(Co_{0.5}Fe_{0.5})O_{(3-\delta)}$ | 1275 | 1200 | | 75 | 1250 | 1200 | 1000 | 3.5 |
| 12 | $Sr(Co_{0.9})(Nb_{0.1})O_{(3-\delta)}$ | $Sr(Co_{0.95})(Nb_{0.05})O_{(3-\delta)}$ | 1275 | 1250 | | 50 | 1300 | 1250 | 100 | 10.0 |
| 13 | $Sr(Co_{0.9})(Nb_{0.2})O_{(3-\delta)}$ | $Sr(Co_{0.9})(Nb_{0.1})O_{(3-\delta)}$ | 1300 | 1275 | | 25 | 1300 | 1275 | 100 | 7.0 |
| 14 | $Sr(Co_{0.9})(Nb_{0.2})O_{(3-\delta)}$ | $Sr(Co_{0.9}Fe_{0.1})O_{(3-\delta)}$ | 1300 | 1200 | | 100 | 1300 | 1200 | 100 | 6.5 |
| 15 | $Sr(Co_{0.9})(Nb_{0.5})O_{(3-\delta)}$ | $Sr(Co_{0.8})(Ta_{0.95})O_{(3-\delta)}$ | 1375 | 1300 | | 75 | 1375 | 1300 | 100 | 5.0 |
| 16 | $(La_{0.05}Sr_{0.95})(Nb_{0.05})O_{(3-\delta)}$ | $(La_{0.05}Sr_{0.95})CoO_{(3-\delta)}$ | 1250 | 1200 | | 50 | 1225 | 1200 | 100 | 7.0 |
| 17 | $Sr(Fe_{0.8})(Nb_{0.2})O_{(3-\delta)}$ | $Sr(Co_{0.7}Fe_{0.2})(Nb_{0.1})O_{(3-\delta)}$ | 1350 | 1300 | | 50 | 1325 | 1300 | 100 | 5.0 |
| 18 | $Sr(Fe_{0.8})(Nb_{0.2})O_{(3-\delta)}$ | $Sr(Co_{0.71}Fe_{0.19})(Nb_{0.1})O_{(3-\delta)}$ | 1350 | 1300 | | 50 | 1325 | 1300 | 100 | 5.0 |
| 19 | $Sr(Fe_{0.8})(Nb_{0.2})O_{(3-\delta)}$ | $Sr(Co_{0.7}Fe_{0.2})(Nb_{0.1})O_{(3-\delta)}$ | 1350 | 1300 | | 50 | 1325 | 1300 | 100 | 4.5 |
| 20 | $(La_{0.2}Sr_{0.5})(Co_{0.8}Fe_{0.1})(Nb_{0.1})O_{(3-\delta)}$ | $(La_{0.2}Sr_{0.8})(Co_{0.8}Fe_{0.2})O_{(3-\delta)}$ | 1275 | 1200 | | 75 | 1250 | 1200 | 100 | 4.5 |
| 21 | $(La_{0.2}Sr_{0.8})(Co_{0.8}Fe_{0.1})(Nb_{0.1})(Cu_{0.1})O_{(3-\delta)}$ | $(La_{0.2}Sr_{0.8})(Co_{0.8}Fe_{0.2})O_{(3-\delta)}$ | 1250 | 1200 | | 50 | 1250 | 1200 | 100 | 4.5 |
| 22 | $Sr(Fe_{0.6})(Ta_{0.4})O_{(3-\delta)}$ | $Sr(Fe_{0.7})(Nb_{0.3})O_{(3-\delta)}$ | 1375 | 1350 | | 25 | 1375 | 1350 | 100 | 3.5 |
| 23 | $Sr(Co_{0.8})(Nb_{0.2})O_{(3-\delta)}$ | $Sr(Co_{0.8}Fe_{0.1})(Nb_{0.1})O_{(3-\delta)}$ | 1300 | 1275 | | 25 | 1300 | 1275 | 100 | 3.0 |
| 24 | $Sr(Co_{0.8})(Nb_{0.2})O_{(3-\delta)}$ | $Sr(Co_{0.77}Fe_{0.1})(Nb_{0.1})O_{(3-\delta)}$ | 1300 | 1275 | | 25 | 1300 | 1275 | 100 | 3.0 |
| 25 | $Sr(Co_{0.9})(Nb_{0.1})O_{(3-\delta)}$ | $Sr(Co_{0.5}Fe_{0.5})O_{(3-\delta)}$ | 1275 | 1200 | | 75 | 1250 | 1200 | 2000 | 1.5 |
| 26 | $Sr(Co_{0.9})(Nb_{0.1})O_{(3-\delta)}$ | $Sr(Co_{0.5}Fe_{0.5})O_{(3-\delta)}$ | 1275 | 1200 | | 75 | 1250 | 1200 | 5 | LEAKAGE OCCURRED |
| 27 | $Sr(Co_{0.02}Fe_{0.56}Cr_{0.01}Ga_{0.01})(Nb_{0.3}Ta_{0.05}Ti_{0.01}Zr_{0.01})(Zn_{0.01}Mg_{0.01}Li_{0.01})O_{(3-\delta)}$ | $(La_{0.2}Sr_{0.8})(Co_{0.6}Fe_{0.1}Cr_{0.08}Ga_{0.02})(Nb_{0.06}Ta_{0.02}Ti_{0.01}Zr_{0.01})(Cu_{0.1})O_{(3-\delta)}$ | 1375 | 1250 | | 125 | 1350 | 1250 | 300 | 4.6 |
| 28 | $Sr(Co_{0.02}Fe_{0.56}Cr_{0.01}Ga_{0.01})(Nb_{0.3}Ta_{0.05}Ti_{0.01}Zr_{0.01})(Zn_{0.01}Mg_{0.01}Li_{0.01})O_{(3-\delta)}$ | $Sr(Fe_{0.95})(Nb_{0.05})O_{(3-\delta)}$ | 1375 | 1250 | | 125 | 1350 | 1250 | 500 | 3.9 |
| 29 | $Sr(Fe_{0.7})(Nb_{0.3})O_{(3-\delta)}$ | $Sr(Fe_{0.90}Cr_{0.03}Ga_{0.02})(Nb_{0.05})O_{(3-\delta)}$ | 1350 | 1250 | | 100 | 1350 | 1250 | 500 | 4.1 |

| COMPARATIVE EXAMPLE | | | | | | | | | | |
|---|---|---|---|---|---|---|---|---|---|---|
| 30 | $(La_{0.2}Sr_{0.8})(Co_{0.8}Fe_{0.2})O_{(3-\delta)}$ | $(La_{0.2}Sr_{0.8})(Co_{0.8}Fe_{0.2})O_{(3-\delta)}$ | 1200 | 1200 | | 0 | 1200 | 1200 | 100 | 2.5 |
| 31 | $(La_{0.2}Sr_{0.8})(Co_{0.8}Fe_{0.2})O_{(3-\delta)}$ | $(La_{0.2}Sr_{0.8})(Co_{0.8}Fe_{0.2})O_{(3-\delta)}$ | 1200 | 1200 | | 0 | 1200 | 1225 | 100 | 0.5 |
| 32 | $Sr(Co_{0.9}Ta_{0.1})O_{(3-\delta)}$ | $Sr(Co_{0.9}Ta_{0.1})O_{(3-\delta)}$ | 1275 | 1275 | | 0 | 1275 | 1275 | 100 | 2.0 |
| 33 | $Sr(Co_{0.9}Nb_{0.1})O_{(3-\delta)}$ | $Sr(Co_{0.9}Nb_{0.1})O_{(3-\delta)}$ | 1275 | 1275 | | 0 | 1275 | 1275 | 100 | 2.5 |

TABLE 4

| | FORMULA | BURNING TEMPERATURE | POROUSNESS AFTER BURNING (%) | POROUSNESS AFTER HEAT TREATMENT (%) |
|---|---|---|---|---|
| COMPARATIVE EXAMPLE | | | | |
| 1 | $(La_{0.2}Sr_{0.8})CoO_{(3-\delta)}$ | 1200 | 35 | 18 |
| 2 | $(La_{0.2}Sr_{0.8})CoO_{(3-\delta)}$ | 1350 | DECOMPOSED IN BURNING | — |
| EXAMPLE | | | | |
| 3 | $SrFeO_{(3-\delta)}$ | 1350 | 40 | 40 |
| 4 | $(Ba_{0.5}Sr_{0.5})FeO_{(3-\delta)}$ | 1350 | 43 | 41 |
| 5 | $(Ca_{0.5}Sr_{0.5})FeO_{(3-\delta)}$ | 1350 | 42 | 41 |
| 6 | $(Ba_{0.5}Ca_{0.5})Fe_{0.98}O_{(3-\delta)}$ | 1350 | 45 | 43 |
| 7 | $SrFe_{1.02}O_{(3-\delta)}$ | 1350 | 35 | 35 |

TABLE 5

| | FORMULA POROUS BODY | FORMULA DENSE THIN FILM | BURNING TEMPERATURE FOR POROUS BODY (°C.) | BURNING TEMPERATURE FOR THIN FILM (°C.) | THICKNESS OF THIN FILM (μm) | AIRTIGHTNESS OF FILM | OXYGEN PERMEATION RATE (cc/cm² · min) |
|---|---|---|---|---|---|---|---|
| COMPARATIVE EXAMPLE | | | | | | | |
| 1 | $(La_{0.2}Sr_{0.8})CoO_{(3-\delta)}$ | $(La_{0.2}Sr_{0.8})CoO_{(3-\delta)}$ | 1200 | 1200 | 100 | ○ | 0.3 |
| 2 | $(La_{0.2}Sr_{0.8})CoO_{(3-\delta)}$ | $(La_{0.2}Sr_{0.8})CoO_{(3-\delta)}$ | 1200 | 1180 | 100 | LEAKAGE OCCURRED | — |
| 3 | $SrFeO_{(3-\delta)}$ | $SrFeO_{(3-\delta)}$ | 1250 | 1200 | 100 | LEAKAGE OCCURRED | — |
| EXAMPLE | | | | | | | |
| 4 | $SrFeO_{(3-\delta)}$ | $(La_{0.3}Sr_{0.7})CoO_{(3-\delta)}$ | 1350 | 1200 | 100 | ○ | 0.6 |
| 5 | $SrFeO_{(3-\delta)}$ | $(La_{0.1}Sr_{0.9})(Co_{0.5}Fe_{0.5})O_{(3-\delta)}$ | 1200 | 1175 | 100 | ○ | 0.9 |
| 6 | $SrFeO_{(3-\delta)}$ | $Sr(Co_{0.9}Nb_{0.1})O_{(3-\delta)}$ | 1400 | 1275 | 100 | ○ | 1.2 |
| 7 | $(Ba_{0.5}Sr_{0.5})FeO_{(3-\delta)}$ | $(La_{0.2}Sr_{0.8})CoO_{(3-\delta)}$ | 1300 | 1200 | 100 | ○ | 0.8 |
| 8 | $(Ca_{0.5}Sr_{0.5})FeO_{(3-\delta)}$ | $(La_{0.2}Sr_{0.8})CoO_{(3-\delta)}$ | 1300 | 1200 | 100 | ○ | 0.7 |
| 9 | $(Ba_{0.5}Ca_{0.5})Fe_{0.98}O_{(3-\delta)}$ | $(La_{0.2}Sr_{0.8})CoO_{(3-\delta)}$ | 1300 | 1200 | 100 | ○ | 1.1 |
| 10 | $SrFe_{1.02}O_{(3-\delta)}$ | $(La_{0.2}Sr_{0.8})CoO_{(3-\delta)}$ | 1300 | 1200 | 100 | ○ | 0.6 |

TABLE 6

LAYER STRUCTURE AND OXYGEN PERMEATION RATE IN EXAMPLE 8

| | EXAMPLE c-2-1 | EXAMPLE c-2-2 | EXAMPLE c-2-3 | COMPARATIVE EXAMPLE |
|---|---|---|---|---|
| OXYGEN EXCHANGE LAYER 1 (HIGH OXYGEN PARTIAL-PRESSURE SIDE) | $La_{0.3}Sr_{0.7}Co_{0.5}O_{3-w}$ DENSE FILM (THICKNESS 5 μm) | $La_{0.3}Sr_{0.7}Fe_{0.5}Co_{0.5}O_{3-w}$ ISLAND-LIKE DISCONTINUOUS FILMS (THICKNESS 10 μm) | $La_{0.3}Sr_{0.7}Fe_{0.5}Co_{0.5}O_{3-w}$ POROUS FILM (THICKNESS 30 μm) | NONE |
| OXIDE ION DIFFUSION LAYER | $La_{0.05}Sr_{0.95}CoO_{3-w}$ DENSE FILM (THICKNESS 100 μm) | SAME AS LEFT | SAME AS LEFT | SAME AS LEFT |
| OXYGEN EXCHANGE LAYER 2 (LOW OXYGEN PARTIAL-PRESSURE SIDE) | $La_{0.3}Sr_{0.7}Fe_{0.5}Co_{0.5}O_{3-w}$ DENSE FILM (THICKNESS 5 μm) | $La_{0.3}Sr_{0.7}Fe_{0.6}Co_{0.5}O_{3-w}$ DENSE FILM (THICKNESS 5 μm) | $La_{0.3}Sr_{0.7}Fe_{0.5}Co_{0.5}O_{3-w}$ POROUS FILM ((THICKNESS 30 μm) | NONE |
| SUPPORT BODY | $SrFeO_{3-w}$ POROUS BODY (THICKNESS 2 mm) | SAME AS LEFT | SAME AS LEFT | SAME AS LEFT |
| OXYGEN PERMEATION RATE (sccm/cm²) | 15.38 | 18.51 | 57.40 | 8.55 |

TABLE 7

LAYER STRUCTURE AND OXYGEN PERMEATION RATE IN EXAMPLE 9

| | EXAMPLE c-3-1 | EXAMPLE c-3-2 | EXAMPLE c-3-3 | EXAMPLE c-3-4 | COMPARATIVE EXAMPLE |
|---|---|---|---|---|---|
| OXYGEN EXCHANGE LAYER 1 (HIGH OXYGEN PARTIAL-PRESSURE SIDE) | $La_{0.2}Sr_{0.8}CoO_{3-w}$ POROUS FILM (THICKNESS 30 μm) | $La_{0.4}Sr_{0.6}CoO_{3-w}$ POROUS FILM (THICKNESS 30 μm) | $La_{0.2}Sr_{0.8}CoO_{3-w}$ POROUS FILM (THICKNESS 30 μm) | $La_{0.4}Sr_{0.6}CoO_{3-w}$ POROUS FILM (THICKNESS 30 μm) | NONE |
| OXIDE ION DIFFUSION LAYER | $La_{0.1}Ba_{0.9}Fe_{0.1}Co_{0.9}O_{3-w}$ DENSE FILM (THICKNESS 120 μm) | SAME AS LEFT | SAME AS LEFT | SAME AS LEFT | SAME AS LEFT |
| OXYGEN EXCHANGE LAYER 2 (LOW OXYGEN PARTIAL-PRESSURE SIDE) | $La_{0.2}Sr_{0.8}CoO_{3-w}$ POROUS FILM (THICKNESS 30 μm) | $La_{0.2}Sr_{0.8}CoO_{3-w}$ POROUS FILM (THICKNESS 30 μm) | $La_{0.4}Sr_{0.6}CoO_{3-w}$ POROUS FILM (THICKNESS 30 μm) | $La_{0.2}Sr_{0.8}CoO_{3-w}$ POROUS FILM (THICKNESS 30 μm) | NONE |
| SUPPORT BODY | $SrFeO_{3-w}$ POROUS BODY (THICKNESS 2 mm) | SAME AS LEFT | SAME AS LEFT | SAME AS LEFT | SAME AS LEFT |
| OXYGEN PERMEATION RATE (sccm/cm$^2$) | 47.87 | 52.58 | 55.55 | 45.60 | 8.34 |

TABLE 8

LAYER STRUCTURE AND OXYGEN PERMEATION RATE IN EXAMPLE 10

| | EXAMPLE c-4-1 | EXAMPLE c-4-2 | COMPARATIVE EXAMPLE |
|---|---|---|---|
| OXYGEN EXCHANGE LAYER 1 (HIGH OXYGEN PARTIAL-PRESSURE SIDE) | $La_{0.2}Sr_{0.8}CoO_{3-w}$ POROUS FILM (THICKNESS 30 μm) | $La_{0.4}Sr_{0.6}CoO_{3-w}$ POROUS FILM (THICKNESS 30 μm) | NONE |
| OXIDE ION DIFFUSION LAYER | $SrCoO_{3-w}$ DENSE FILM (THICKNESS 100 μm) | SAME AS LEFT | SAME AS LEFT |
| OXYGEN EXCHANGE LAYER 2 (LOW OXYGEN PARTIAL-PRESSURE SIDE) | $La_{0.4}Sr_{0.6}CoO_{3-w}$ POROUS FILM (THICKNESS 30 μm) | NONE | NONE |
| SUPPORT BODY | $SrFeO_{3-w}$ POROUS BODY (THICKNESS 2 mm) | $La_{0.4}Sr_{0.6}CoO_{3-w}$ POROUS BODY (THICKNESS 2 mm) | $SrFeO_{3-w}$ POROUS BODY (THICKNESS 2 mm) |
| OXYGEN PERMEATION RATE (sccm/cm$^2$) | 68.93 | 68.34 | 8.63 |

TABLE 9

LAYER STRUCTURE AND OXYGEN PERMEATION RATE IN EXAMPLE 9

| | EXAMPLE c-5-1 | EXAMPLE c-5-2 | EXAMPLE c-5-3 | EXAMPLE c-5-4 | EXAMPLE c-5-5 |
|---|---|---|---|---|---|
| OXYGEN EXCHANGE LAYER 1 (HIGH OXYGEN PARTIAL-PRESSURE SIDE) | $La_{0.2}Sr_{0.8}CoO_{3-w}$ POROUS FILM (THICKNESS 30 μm) | $La_{0.4}Sr_{0.6}CoO_{3-w}$ POROUS FILM (THICKNESS 30 μm) | $La_{0.2}Sr_{0.6}CoO_{3-w}$ POROUS FILM (THICKNESS 30 μm) | $La_{0.4}Sr_{0.6}CoO_{3-w}$ POROUS FILM (THICKNESS 30 μm) | $SrCoO_{3-w}$ POROUS FILM (THICKNESS 30 μm) |
| OXIDE ION DIFFUSION LAYER | $(La_{0.3}Sr_{0.7})CoO_{(3-\delta)}$ DENSE FILM (THICKNESS 100 μm) | $(La_{0.05}Sr_{0.95})CoO_{(3-\delta)}$ DENSE FILM (THICKNESS 100 μm) | $Sr(Co_{0.5}Fe_{0.5})O_{(3-\delta)}$ DENSE FILM (THICKNESS 100 μm) | $Sr(Co_{0.05}Nb_{0.05})O_{(3-\delta)}$ DENSE FILM (THICKNESS 100 μm) | $Sr(Co_{0.4}Co_{0.39}Nb_{0.2})O_{(3-\delta)}$ DENSE FILM (THICKNESS 100 μm) |
| SUPPORT BODY | $Sr(Co_{0.9}Nb_{0.1})O_{(3-\delta)}$ POROUS BODY (THICKNESS 1 mm) | $Sr(Co_{0.9}Nb_{0.1})O_{(3-\delta)}$ POROUS BODY (THICKNESS 1 mm) | $Sr(Co_{0.9}Nb_{0.1})O_{(3-\delta)}$ POROUS BODY (THICKNESS 1 mm) | $Sr(Co_{0.8}Nb_{0.2})O_{(3-\delta)}$ POROUS BODY (THICKNESS 1 mm) | $Sr(Fe_{0.9}Nb_{0.1})O_{(3-\delta)}$ POROUS BODY (THICKNESS 1 mm) |
| OXYGEN PERMEATION RATE (sccm/cm$^2$) | 15.2 | 42.0 | 24.8 | 53.7 | 19.3 |
| | COMPARATIVE EXAMPLE c-5-1 | COMPARATIVE EXAMPLE c-5-2 | COMPARATIVE EXAMPLE c-5-3 | COMPARATIVE EXAMPLE c-5-4 | COMPARATIVE EXAMPLE c-5-5 |
| OXYGEN EXCHANGE LAYER 1 (HIGH OXYGEN PARTIAL-PRESSURE SIDE) | NONE | NONE | NONE | NONE | NONE |

TABLE 9-continued

LAYER STRUCTURE AND OXYGEN PERMEATION RATE IN EXAMPLE 9

| OXIDE ION DIFFUSION LAYER | $(La_{0.3}Sr_{0.7})CoO_{(3-\delta)}$ DENSE FILM (THICKNESS 100 μm) | $(La_{0.05}Sr_{0.95})CoO_{(3-\delta)}$ DENSE FILM (THICKNESS 100 μm) | $Sr(Co_{0.5}Fe_{0.5})O_{(3-\delta)}$ DENSE FILM (THICKNESS 100 μm) | $Sr(Co_{0.05}Nb_{0.05})O_{(3-\delta)}$ DENSE FILM (THICKNESS 100 μm) | $Sr(Co_{0.4}Co_{0.39}Nb_{0.2})O_{(3-\delta)}$ DENSE FILM (THICKNESS 100 μm) |
|---|---|---|---|---|---|
| SUPPORT BODY | $Sr(Co_{0.9}Nb_{0.1})O_{(3-\delta)}$ POROUS BODY (THICKNESS 1 mm) | $Sr(Co_{0.9}Nb_{0.1})O_{(3-\delta)}$ POROUS BODY (THICKNESS 1 mm) | $Sr(Co_{0.9}Nb_{0.1})O_{(3-\delta)}$ POROUS BODY (THICKNESS 1 mm) | $Sr(Co_{0.8}Nb_{0.2})O_{(3-\delta)}$ POROUS BODY (THICKNESS 1 mm) | $Sr(Fe_{0.9}Nb_{0.1})O_{(3-\delta)}$ POROUS BODY (THICKNESS 1 mm) |
| OXYGEN PERMEATION RATE (sccm/cm²) | 3.0 | 7.5 | 4.5 | 10.0 | 4.5 |

What is claimed is:

1. A ceramic composition as a mixed conducting oxide in perovskite structure, said composition being expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions.

2. A composition according to claim 1, wherein B always containing Fe, the molar number of Co being within the range of 0% to 10% of the total molar number of Fe, the sum of the molar numbers of Cr and Ga being within the range of 0% to 20% of the total molar number x of B; and BΔ represents one or a combination of elements selected from the group of Zn, Li, and Mg.

3. A composite material comprising a porous body portion comprising a mixed conducting oxide, and a film portion including a gastight dense continuous layer of a mixed conducting oxide formed on said porous body portion, wherein at least one of said porous body portion and said dense continuous layer includes a ceramic composition in perovskite structure expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions.

4. A composite material comprising a porous body portion comprising a mixed conducting oxide, and a film portion including a gastight dense continuous layer of a mixed conducting oxide formed on said porous body portion, wherein at least one of said porous body portion and said dense continuous layer includes a ceramic composition in perovskite structure expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being in the range of 0% to 10% of the molar number of Fe, the sun of the molar numbers of Cr and a being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Zn, Li, and Mg;

$0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions.

5. An oxygen separator including a ceramic composition as a mixed conducting oxide In perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

6. An oxygen separator including a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being In the range of 0% to 10% of the molar number of Fe, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

7. A chemical reactor including a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ca being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

8. A chemical reactor including a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being in the range of 0% to 10% of the molar number of Fe, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

9. A method of producing a composite material, wherein a porous body portion comprising a mixed conducting oxide of claim 1 is sintered at a temperature higher than the sintering temperature for a dense continuous layer of a mixed conducting oxide formed on said porous body portion.

10. A composite material comprising a porous body portion comprising a mixed conducting oxide of claim 1, and a film portion including a dense continuous layer of a mixed conducting oxide formed on said porous body portion, wherein the sintering temperature for the oxide material of said porous body portion is higher than that for the oxide material of said film portion.

11. A material according to claim 10, wherein the porosity of said porous body portion is within the range of 20% to 80%, and the thickness of said dense continuous layer is within the range of 10 μm to 1 mm.

12. A composite material comprising a porous body portion comprising a mixed conducting oxide, and a film portion including a dense continuous layer of a mixed conducting oxide formed on said porous body portion, wherein said porous body portion comprises a ceramic composition as a mixed conducting oxide in perovskite structure, said composition being expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B'' represents one or a combination of elements selected from the group of Cu, Ni, Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

13. A composite material comprising a porous body portion comprising a mixed conducting oxide, and a film portion including a dense continuous layer of a mixed conducting oxide formed on said porous body portion, wherein said porous body portion comprises a ceramic composition as a mixed conducting oxide in perovskite structure, said composition being expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being within the range of 0% to 10% of the total molar number of Fe, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B'' represents one or a combination of elements selected from the group of Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

14. A composite material with a porous body portion comprising a mixed conducting oxide, and a film portion including a gastight dense continuous layer of a mixed conducting oxide formed on said porous body portion, wherein said mixed conducting oxide of said porous body portion is expressed by general formula (2)

$$AFe_xO_{(3-\delta)} \qquad (2)$$

where $0.98 \leq x \leq 1.02$; A represents one or a combination of elements selected from the group of Ba, Sr, and Ca; and δ represents a value which is so determined as to meet charge neutralization conditions and said mixed conducting oxide of said dense continuous layer is of general formula (3)

$$\{Ln_{1-a}A_a\}\{B_xB'_yB''_z\}O_{(3-\delta)} \qquad (3)$$

where Ln represents one or a combination of elements selected from the group of Y and lanthanoids;

A represents one or a combination of elements selected from the group of Ba, Sr, and Ca;

B represents one or a combination of elements selected from the group of Fe and Co;

B' represents one or a combination of elements selected from the group of Cu, Ni, Zn, Li, and Mg;

$0.8 \leq a \leq 1; 0 < x; 0 < y \leq 0.5; 0 \leq z \leq 0.2$ $0.98 \leq x+y+z \leq 1.02$; and δ represents a value which is so determined as to meet charge neutralization conditions.

15. A material according to claim 14, wherein said material is made in a manner that said porous body portion comprising said mixed conducting oxide of claim 1 is sintered at a temperature higher than the sintering temperature for said dense continuous layer of said mixed conducting oxide to be formed on said porous body portion, and then said film portion including said dense continuous layer is formed on said porous body portion.

16. A method of producing a composite material the method comprising:

providing a porous body portion including a mixed conducting oxide, said mixed conducting oxide of said porous body portion comprising a mixed conducting oxide expressed by the following general formula (2):

$$AFe_xO_{(3-\delta)} \qquad (2)$$

where $0.98 \leq x \leq 1.02$; A represents one or a combination of elements selected from the group of Bs, Sr, and Ca; and δ represents a value which is so determined as to meet charge neutralization conditions, subjecting said porous body portion to a heat treatment, the maximum temperature not to exceed 1400° C.;

forming a film portion including a gastight continuous layer of a mixed conducting oxide on said porous body portion; and subjecting said dense continuous layer to a heat treatment, the maximum temperature for which is lower than the maximum temperature for said porous body portion by 20° C. or more.

17. A composite material comprising:

a porous body portion comprising a mixed conducting oxide, and a film portion including a dense continuous layer of a mixed conducting oxide formed on said porous body portion, wherein said porous body portion comprises a ceramic composition as B mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B'' represents one or a combination of elements selected from the group of Cu, Ni, Zn, Li, and Mg;

$0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions; and wherein said dense continuous layer is made of a ceramic of a mixed conducting oxide having its composition expressed by the following general formula (3):

$$\{Ln_{1-a}A_a\}\{B_xB''_y\}O_{(3-\delta)} \quad (3)$$

where Ln represents one or a combination of elements selected from the group of Y and lanthanoids;

A represents one or a combination of elements selected from the group of Ba, Sr, and Ca;

B represents one or a combination of elements selected from the group of Fe and Co, B' represents one or a combination of elements selected from the group of Cu, Ni, Zn, Li, and Mg, $0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions.

18. A composite material comprising:

a porous body portion comprising a mixed conducting oxide, and a film portion including a dense continuous layer of a mixed conducting oxide formed on said porous body portion, wherein said porous body portion comprises a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being within the range of 0% to 10% of the total molar number of Fe, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B'' represents one or a combination of elements selected from the group of Zn, Li, and Mg;

$0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions; and wherein said dense continuous layer Is made of a ceramic of a mixed conducting oxide having its composition expressed by the following general formula (3):

$$\{Ln_{1-a}A_a\}\{B_xB'_y\}O_{(3-\delta)} \quad (3)$$

where Ln represents one or a combination of elements selected from the group of Y and lanthanoids;

A represents one or a combination of elements selected from the group of Ba, Sr, and Ca;

B represents one or a combination of elements selected from the group of Fe and Co, B' represents one or a combination of elements selected from the group of Cu, Ni, Zn, Li, and Mg;

$0.8 \leq a \leq 1; \ 0 < x; \ 0 < y \leq 0.5; \ 0 \leq z \leq 0.2$ $0.98 \leq x+y+z \leq 1.02$; and δ represents a value which is so determined as to meet charge neutralization conditions.

19. A material according to claim 10, wherein said dense continuous layer is made of a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0<x; 0<y \leq 0.5; 0 \leq z \leq 0.2$ $0.98 \leq x+y+z \leq 1.02$; and δ represents a value which is so determined as to meet charge neutralization conditions.

20. A composite material comprising:

a porous body portion comprising a mixed conducting oxide, and a film portion including a dense continuous layer of a mixed conducting oxide formed on said porous body portion, wherein said porous body portion and said dense continuous layer are made of a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0<x; 0<y \leq 0.5; 0 \leq z \leq 0.2$ $0.98 \leq x+y+z \leq 1.02$; and δ represents a value which is so determined as to meet charge neutralization conditions.

21. A material according to claim 10, wherein said dense continuous layer is made of a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being within the range of 0% to 10% of the total molar number of Fe, the sum of the molar numbers of Cr and Ga being within the range of 0% to 20% of the total molar number x of B;

B' represents one or a combination of elements selected from the group of Nb, Ta, Ti and Zr, B' always containing Nb or Ta, the sum of the molar numbers of Ti and Zr being within the range of 0% to 20% of the total molar number y of B';

B" represents one or a combination of elements selected from the group of Zn, Li, and Mg;

$0.8 \leq a \leq 1; 0<x; 0<y \leq 0.5; 0 \leq z \leq 0.2$ $0.98 \leq x+y+z \leq 1.02$; and δ represents a value which is so determined as to meet charge neutralization conditions.

22. A material according to claim 12, wherein said dense continuous layer is made of a ceramic composition as a mixed conducting oxide in perovskite structure, said composition being expressed by the following general formula (1):

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Cu, Ni, Zn, Li, and Mg;

$0.8 \leq a \leq 1; 0<x; 0<y \leq 0.5; 0 \leq z \leq 0.2$ $0.98 \leq x+y+z \leq 1.02$; and δ represents a value which is so determined as to meet charge neutralization conditions, the sum of the molar numbers of Nb and Ta for the dense continuous layer is smaller that that for the porous body.

23. A material according to claim 22, wherein, in said formula (1) expressing said ceramic composition of said dense continuous layer, B always containing Fe, the molar number of Co being within the range of 0% to 10% of the total molar number of Fe, and B" represents one or a combination of elements selected from the group of Zn, Li, and Mg.

24. A composite material with a dense continuous layer comprising a mixed conducting oxide in perovskite structure, said composition being expressed by the following general formula (1)

$$\{Ln_{1-a}A_a\}\{B_xB'_yB''_z\}O_{(3-\delta)} \quad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe or Co, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from The group of Cu, Ni, Zn, Li, and Mg;

$0.8 \leq a \leq 1$; $0<x$; $0<y \leq 0.5$; $0 \leq z \leq 0.2$ $0.98 \leq x+y+z \leq 1.02$; and δ represents a value which is so determined as to meet charge neutralization conditions; and a porous body portion comprising a mixed conducting oxide, said porous body portion is expressed by general formula (2):

$$AFe_xO_{(3-\delta)} \qquad (2)$$

where $0.98 \leq x \leq 1.02$; A represents one or a combination of elements selected from the group of Ba, Sr, and Ca; and δ represents a value which is so determined as to meet charge neutralization conditions.

25. A material according to claim 24, wherein, in said formula (1) expressing said ceramic composition of said dense continuous layer, B always containing Fe, the molar number of Co being within the range of 0% to 10% of the total molar number of Fe; and B" represents one or a combination of elements selected from the group of Zn, Li, and Mg.

26. A material according to claim 12 or 14, wherein said dense continuous layer is made of a ceramic of a mixed conducting oxide having its composition expressed by the following general formula (4)

$$\{Ln_{1-x}A_x\}_yCoO_{(3-\delta)} \qquad (4)$$

where Ln represents one or a combination of elements selected from the group of Y and lanthanoids; A represents one or a combination of elements selected from the group of Ba, Sr, and Ca; $0.8 \leq x \leq 1$; $0.98 \leq y \leq 1.02$; and δ represents a value which is so determined as to meet charge neutralization conditions.

27. A material according to claim 12 or 14, wherein said dense continuous layer is made of a ceramic of a mixed conducting oxide having its composition expressed by the following general formula (5)

$$A\{Co_{1-x}Fe_x\}_yO_{(3-\delta)} \qquad (5)$$

where A represents one or a combination of elements selected from the group of Ba, Sr, and Ca; $0 \leq x \leq 0.2$; $0.98 \leq y \leq 1.02$; and δ represents a value which is so determined as to meet charge neutralization conditions.

28. A material according to claim 12 or 14, wherein said dense continuous layer is made of a ceramic of a mixed conducting oxide having its composition expressed by the following general formula (6):

$$A\{Co_xFe_yB_z\}O_{(3-\delta)} \qquad (6)$$

where A represents one or a combination of elements selected from the group of Ba, Sr, and Ca; B represents one or a combination of elements selected from the group of Cu, Ni, and Zn; $0 \leq x$; $0 \leq y$; $0<z \leq 0.2$; $0.98 \leq x+y+z \leq 1.02$; and δ represents a value which is so determined as to meet charge neutralization conditions.

29. A material according to claim 12, wherein said dense continuous layer is made of a ceramic of a mixed conducting oxide having its composition expressed by the following general formula (7):

$$A\{Co_xFe_yB_z\}O_{(3-\delta)} \qquad (7)$$

where A represents one or a combination of elements selected from the group of Ba, Sr, and Ca; B represents one or a combination of elements selected form the group of Nb and Ta; $0 \leq x$; $0 \leq y$; $0<z \leq 0.2$; $0.98 \leq x+y+z \leq 1.02$; and δ represents a value which is so determined as to meet charge neutralization conditions.

30. A material according to claim 12, wherein said dense continuous layer is made of a ceramic of a mixed conducting oxide having its composition expressed by the following general formula (8):

$$A\{Co_xFe_yB_zB'_{x'}\}O_{(3-\delta)} \qquad (8)$$

where A represents one or a combination of elements selected from the group of Ba, Sr, and Ca; B represents one or a combination of elements selected from the group of Nb and Ta; B' represents one or a combination of elements selected from the group of Cu, Ni, and Zn; $0 \leq x$; $0 \leq y$; $0<z \leq 0.2$; $0 \leq z' \leq 0.2$; $0.98 \leq x+y+z+z'' \leq 1.02$; and δ represents a value which is so determined as to meet charge neutralization conditions.

31. A composite material comprising an oxygen exchange layer disposed on one side or two sides of an oxide having oxide ion diffusivity and porosity from 20% to 80%, wherein said oxygen exchange layer comprises an oxide expressed by $$La_uSr_{b-u}Fe_vCo_{c-v}O_{3-w},$$

wherein $0.1 \leq u<0.5$, $0.9<b<1.1$, $0<v<1.1$, and $0.9<c<1.1$., and is of different oxide composition than said oxide having oxide ion diffusivity.

32. A material according to claim 31, wherein said oxygen exchange layer comprises a dense film, a porous body, or island-shaped discontinuous film whose average thickness is 30 μm or less.

33. A material according to claim 31, wherein said oxide having oxide ion diffusivity is formed into a thin film whose thickness is 300 μm or less.

34. A material according to claim 3, 4 or 14, wherein an oxygen exchange layer is formed on a surface of one or either side of said dense continuous layer, said oxygen exchange layer being made of an oxide of different composition than the oxide forming said dense continuous layer.

35. A material according of claims 3, 4 or 14, wherein the porosity of said porous body portion is within the range of 20% to 80%, and the thickness of said dense continuous layer is within the range of 10 μm to 1 mm.

36. A method of making a composite material for the separation of oxygen from a mixed gas, comprising: providing a sintered, porous body portion comprising a mixed conducting oxide, wherein said porous body portion com prises a ceramic composition as a mixed conducting oxide in perovskite structure, said composition being expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co be within the range of 0% to 10% of the total molar number of Fe, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Zn, Li, and Mg;

$0.8 \leq a \leq 1$; $0 < x$; $0 < y \leq 0.5$; $0 \leq z \leq 0.2$ $0.98 \leq x+y+z \leq 1.02$; and δ represents a value which is so determined as to meet charge neutralization conditions; and forming a sintered film portion including a gastight dense continuous layer of a mixed conducting oxide on said porous body portion, wherein the maximum sintering temperature for said mixed conducting oxide of porous body portion is greater than the maximum sintering temperature for said dense continuous layer.

37. A method of making a composite material for use as a chemical reactor, comprising: providing a sintered, porous body portion comprising a mixed conducting oxide, wherein said porous body portion comprises a ceramic composition as a mixed conducting oxide in perovskite structure, said composition being expressed by the following general formula (1):

$$\{Ln_{1-a}A_a\}\{B_xB'_yB''_z\}O_{(3-\delta)} \qquad (1)$$

where Ln represents one or a combination of elements selected from the group of Y and lanthanoids;

A represents one or a combination of elements selected from the group of Ba, Sr, and Ca;

B represents one or a combination of elements selected from the group of Co, Fe, Cr, and Ga, B always containing Fe, the molar number of Co being within the range of 0% to 10% of the total molar number of Fe, the sum of the molar numbers of Cr and Ga being within the range of 0% to 20% of the total molar number x of B;

B' represents one or a combination of elements selected from the group of Nb, Ta, Ti, and Zr, B' always containing Nb or Ta, the sum of the molar numbers of Ti and Zr being within the range of 0% to 20% of the total molar number y of B';

B" represents one or a combination of elements selected from the group of Zn, Li, and Mg;

$0.8 \leq a \leq 1$; $0 < x$; $0 < y \leq 0.5$; $0 \leq z \leq 0.2$ $0.98 \leq x+y+z \leq 1.02$; and δ represents a value which is so determined as to meet charge neutralization conditions; and forming a sintered film portion including a gastight dense continuous layer of a mixed conducting oxide on said porous body portion, wherein the maximum sintering temperature for said mixed conducting oxide of porous body portion is greater than the maximum sintering temperature for said dense continuous layer.

* * * * *